US010049314B2

(12) United States Patent
Nemet et al.

(10) Patent No.: US 10,049,314 B2
(45) Date of Patent: *Aug. 14, 2018

(54) BARCODED INDICATORS FOR QUALITY MANAGEMENT

(71) Applicant: Varcode Ltd., Rosh Ha'ayin (IL)

(72) Inventors: Yaron Nemet, Kedumim (IL); Rotem Eshedkaner, Magshimim (IL); Ephraim Brand, Givatayim (IL)

(73) Assignee: Varcode Ltd., Rosh Ha'ayin (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/632,916

(22) Filed: Jun. 26, 2017

(65) Prior Publication Data

US 2017/0344865 A1    Nov. 30, 2017

Related U.S. Application Data

(63) Continuation of application No. 15/063,804, filed on Mar. 8, 2016, now Pat. No. 9,710,743, which is a
(Continued)

(30) Foreign Application Priority Data

Nov. 13, 2008  (WO) ................. PCT/IL2008/001494
Nov. 13, 2008  (WO) ................. PCT/IL2008/001495
(Continued)

(51) Int. Cl.
    *G06K 7/10*    (2006.01)
    *G06K 19/06*   (2006.01)
    (Continued)

(52) U.S. Cl.
    CPC .......... *G06K 19/0614* (2013.01); *G01D 7/00* (2013.01); *G01D 7/005* (2013.01); *G06K 7/1413* (2013.01);
(Continued)

(58) Field of Classification Search
    CPC ................. G06K 7/10; G06K 19/06
(Continued)

(56) References Cited

U.S. PATENT DOCUMENTS

| 4,057,029 A | 11/1977 | Seiter |
|---|---|---|
| 4,059,407 A | 11/1977 | Hochstrasser |

(Continued)

FOREIGN PATENT DOCUMENTS

| CN | 1720180 | 1/2006 |
|---|---|---|
| CN | 1914621 | 2/2007 |

(Continued)

OTHER PUBLICATIONS

An Office Action dated Nov. 4, 2013, which issued during the prosecution of U.S. Appl. No. 13/323,906.
(Continued)

*Primary Examiner* — Daniel Hess
(74) *Attorney, Agent, or Firm* — Fish & Richardson P.C.

(57) ABSTRACT

A barcoded indicator operative to provide a machine-readable indication of exceedance of at least one threshold by at least one product quality affecting parameter, the barcoded indicator including a first barcode including a first plurality of barcode bars and at least a first colorable area, at least a second barcode including a second plurality of barcode bars and at least a second colorable area, and at least one interposed line extending between the first barcode and the second barcode, the interposed line being capable of preventing a barcode reader from reading parts of the first barcode and of the second barcode as part of a single barcode.

12 Claims, 22 Drawing Sheets

Related U.S. Application Data continuation of application No. 14/055,422, filed on Oct. 16, 2013, now Pat. No. 9,317,794, which is a continuation of application No. 13/321,477, filed as application No. PCT/IL2010/000205 on Mar. 10, 2010, now Pat. No. 8,579,193, which is a continuation-in-part of application No. 12/469,309, filed on May 20, 2009, now Pat. No. 8,091,776.

(60) Provisional application No. 61/131,644, filed on Jun. 10, 2008, provisional application No. 61/231,799, filed on Aug. 6, 2009.

(30) Foreign Application Priority Data

| | | |
|---|---|---|
| May 20, 2009 | (WO) | PCT/IL2009/000503 |
| Dec. 9, 2009 | (WO) | PCT/IL2009/001167 |

(51) Int. Cl.
| | |
|---|---|
| *G01D 7/00* | (2006.01) |
| *G06Q 30/06* | (2012.01) |
| *G06Q 10/08* | (2012.01) |
| *G06K 7/14* | (2006.01) |

(52) U.S. Cl.
CPC ....... *G06K 7/1417* (2013.01); *G06K 19/0615* (2013.01); *G06K 19/06028* (2013.01); *G06K 19/06037* (2013.01); *G06K 19/06046* (2013.01); *G06Q 10/087* (2013.01); *G06Q 30/06* (2013.01)

(58) Field of Classification Search
USPC .......................................... 235/383, 385, 494
See application file for complete search history.

(56) References Cited

U.S. PATENT DOCUMENTS

| | | |
|---|---|---|
| RE31,586 E | 5/1984 | Magnussen |
| 4,674,065 A | 6/1987 | Lange et al. |
| 5,053,339 A | 10/1991 | Patel |
| 5,084,143 A | 1/1992 | Smith |
| 5,085,802 A | 2/1992 | Jalinski |
| 5,146,405 A | 9/1992 | Church et al. |
| 5,202,677 A | 4/1993 | Parker et al. |
| 5,254,473 A | 10/1993 | Patel |
| 5,369,577 A | 11/1994 | Kadashevich et al. |
| 5,451,932 A | 9/1995 | Wunderlich et al. |
| 5,485,372 A | 1/1996 | Golding et al. |
| 5,499,597 A | 3/1996 | Kronberg |
| 5,591,952 A | 1/1997 | Krichever |
| 5,600,119 A | 2/1997 | Dvorkis |
| 5,617,488 A | 4/1997 | Hong et al. |
| 5,634,195 A | 5/1997 | Sawyer |
| 5,659,771 A | 8/1997 | Golding |
| 5,752,227 A | 5/1998 | Lyberg |
| 5,805,245 A | 9/1998 | Davis |
| 5,822,728 A | 10/1998 | Applebaum et al. |
| 5,828,991 A | 10/1998 | Skiena et al. |
| 5,841,285 A | 11/1998 | Bailey |
| 5,882,116 A | 3/1999 | Backus |
| 5,895,075 A | 4/1999 | Edwards |
| 5,899,973 A | 5/1999 | Bandara et al. |
| 5,902,982 A | 5/1999 | Lappe |
| 5,907,839 A | 5/1999 | Roth |
| 5,936,508 A | 8/1999 | Parker |
| 5,956,739 A | 9/1999 | Golding et al. |
| 6,006,221 A | 12/1999 | Liddy et al. |
| 6,009,400 A | 12/1999 | Blackman |
| 6,036,092 A | 3/2000 | Lappe |
| 6,085,206 A | 7/2000 | Domini et al. |
| 6,098,034 A | 8/2000 | Razin et al. |
| 6,154,722 A | 11/2000 | Bellegarda |
| 6,173,261 B1 | 1/2001 | Arai et al. |
| 6,190,610 B1 | 2/2001 | Goldsmith et al. |
| 6,214,623 B1 | 4/2001 | Simons et al. |
| 6,272,242 B1 | 8/2001 | Saitoh et al. |
| 6,314,400 B1 | 11/2001 | Klakow |
| 6,335,922 B1 | 1/2002 | Tiedemann et al. |
| 6,366,759 B1 | 4/2002 | Burstein et al. |
| 6,424,983 B1 | 7/2002 | Schabes et al. |
| 6,456,972 B1 | 9/2002 | Gladstein et al. |
| 6,479,016 B1 | 11/2002 | Goldsmith |
| 6,495,368 B1 | 12/2002 | Wallach |
| 6,544,925 B1 | 4/2003 | Prusik et al. |
| 6,685,094 B2 | 2/2004 | Cameron |
| 6,751,584 B2 | 6/2004 | Bangalore |
| 6,758,397 B2 | 7/2004 | Catan |
| 6,920,420 B2 | 7/2005 | Lin |
| 6,982,640 B2 | 1/2006 | Lindsay |
| 7,017,806 B2 | 3/2006 | Peterson |
| 7,020,338 B1 | 3/2006 | Cumbee |
| 7,030,863 B2 | 4/2006 | Longe et al. |
| 7,053,777 B2 | 5/2006 | Allen |
| 7,054,293 B2 | 5/2006 | Tiedemann et al. |
| 7,057,495 B2 | 6/2006 | Debord |
| RE39,226 E | 8/2006 | Lappe |
| 7,092,567 B2 | 8/2006 | Ma et al. |
| RE39,266 E | 9/2006 | Lohray et al. |
| 7,117,144 B2 | 10/2006 | Goodman et al. |
| 7,156,597 B2 | 1/2007 | Goldsmith et al. |
| 7,157,048 B2 | 1/2007 | Goldsmith et al. |
| 7,165,019 B1 | 1/2007 | Lee et al. |
| 7,166,345 B2 | 1/2007 | Myers |
| 7,184,950 B2 | 2/2007 | Weise |
| 7,224,346 B2 | 5/2007 | Sheng |
| 7,262,792 B2 | 8/2007 | Shniberg |
| 7,277,088 B2 | 10/2007 | Robinson et al. |
| 7,295,965 B2 | 11/2007 | Haigh et al. |
| 7,295,968 B2 | 11/2007 | Bietrix et al. |
| 7,296,019 B1 | 11/2007 | Chandrasekar et al. |
| 7,340,388 B2 | 3/2008 | Soricut |
| 7,386,442 B2 | 6/2008 | Dehlinger et al. |
| 7,457,808 B2 | 11/2008 | Gaussier |
| 7,475,015 B2 | 1/2009 | Epstein et al. |
| 7,558,725 B2 | 7/2009 | Greenwald et al. |
| 7,562,811 B2 | 7/2009 | Nemet et al. |
| 7,584,093 B2 | 9/2009 | Potter et al. |
| 7,587,217 B1 | 9/2009 | Laakso et al. |
| 7,590,626 B2 | 9/2009 | Li et al. |
| 7,702,680 B2 | 4/2010 | Yih et al. |
| 7,747,427 B2 | 6/2010 | Lee et al. |
| 7,813,916 B2 | 10/2010 | Bean |
| 7,917,355 B2 | 3/2011 | Wu et al. |
| 8,005,664 B2 | 8/2011 | Hanumanthappa |
| 8,091,776 B2 | 1/2012 | Nemet |
| 8,196,821 B2 | 6/2012 | Nemet |
| 8,271,266 B2 | 9/2012 | Gallagher et al. |
| 8,321,786 B2 | 11/2012 | Lunati |
| 8,341,520 B2 | 12/2012 | Iakobashvili et al. |
| 8,365,070 B2 | 1/2013 | Song et al. |
| 8,473,278 B2 | 6/2013 | Futagi et al. |
| 8,500,014 B2 | 8/2013 | Nemet et al. |
| 8,528,808 B2 | 9/2013 | Nemet |
| 8,540,156 B2 | 9/2013 | Nemet |
| 8,579,193 B2 * | 11/2013 | Nemet .................. G06Q 30/06 235/383 |
| 8,626,786 B2 | 1/2014 | Halcrow et al. |
| 8,807,422 B2 | 8/2014 | Nemet |
| 8,950,664 B2 | 2/2015 | Nemet et al. |
| 8,960,534 B2 | 2/2015 | Nemet et al. |
| 8,967,467 B2 | 3/2015 | Nemet et al. |
| 9,122,963 B2 | 9/2015 | Nemet |
| 9,135,544 B2 | 9/2015 | Nemet et al. |
| 9,317,794 B2 * | 4/2016 | Nemet ............... G06K 19/0614 |
| 9,349,086 B2 | 5/2016 | Nemet et al. |
| 9,373,100 B2 | 6/2016 | Nemet et al. |
| 9,384,435 B2 | 7/2016 | Nemet et al. |
| 9,396,423 B2 | 7/2016 | Nemet et al. |
| 9,400,952 B2 | 7/2016 | Nemet |
| 9,558,439 B2 | 1/2017 | Nemet et al. |
| 9,626,610 B2 | 4/2017 | Nemet et al. |

(56) References Cited

U.S. PATENT DOCUMENTS

| | | | |
|---|---|---|---|
| 9,633,296 | B2 | 4/2017 | Nemet |
| 9,646,237 | B2 | 5/2017 | Nemet et al. |
| 9,646,277 | B2 | 5/2017 | Nemet et al. |
| 9,710,743 | B2 * | 7/2017 | Nemet .............. G06K 19/0614 |
| 2002/0012332 | A1 | 1/2002 | Tiedemann et al. |
| 2002/0032564 | A1 | 3/2002 | Eshani et al. |
| 2002/0056756 | A1 | 5/2002 | Cameron et al. |
| 2002/0128821 | A1 | 9/2002 | Ehsani |
| 2002/0169595 | A1 | 11/2002 | Agichtein et al. |
| 2003/0187632 | A1 | 10/2003 | Menich |
| 2003/0204569 | A1 | 10/2003 | Andrews et al. |
| 2003/0210249 | A1 | 11/2003 | Simske |
| 2003/0227392 | A1 | 12/2003 | Ebert |
| 2003/0233222 | A1 | 12/2003 | Soricut et al. |
| 2004/0002849 | A1 | 1/2004 | Zhou |
| 2004/0018641 | A1 | 1/2004 | Goldsmith et al. |
| 2004/0030540 | A1 | 2/2004 | Ovil et al. |
| 2004/0093567 | A1 | 5/2004 | Schabes et al. |
| 2004/0138869 | A1 | 7/2004 | Heinecke |
| 2004/0215514 | A1 | 10/2004 | Devlin |
| 2004/0260543 | A1 | 12/2004 | Horowitz |
| 2005/0043940 | A1 | 2/2005 | Elder |
| 2005/0044495 | A1 | 2/2005 | Lee et al. |
| 2005/0053900 | A1 | 3/2005 | Kaufmann |
| 2005/0083413 | A1 | 4/2005 | Reed et al. |
| 2005/0091030 | A1 | 4/2005 | Jessee et al. |
| 2005/0091088 | A1 | 4/2005 | Peterson |
| 2005/0108001 | A1 | 5/2005 | Aarskog |
| 2005/0120002 | A1 | 6/2005 | Behbehani |
| 2005/0139686 | A1 | 6/2005 | Helmer et al. |
| 2005/0143971 | A1 | 6/2005 | Burstein |
| 2005/0162274 | A1 | 7/2005 | Shniberg et al. |
| 2005/0209844 | A1 | 9/2005 | Wu et al. |
| 2005/0257146 | A1 | 11/2005 | Ashcraft et al. |
| 2006/0003297 | A1 | 1/2006 | Wiig et al. |
| 2006/0032427 | A1 | 2/2006 | Ishii et al. |
| 2006/0048055 | A1 | 3/2006 | Wu et al. |
| 2006/0057022 | A1 | 3/2006 | Williams |
| 2006/0074655 | A1 | 4/2006 | Bejar et al. |
| 2006/0081711 | A1 | 4/2006 | Zhao et al. |
| 2006/0110714 | A1 | 5/2006 | Symmes |
| 2006/0129381 | A1 | 6/2006 | Wakita |
| 2006/0247914 | A1 | 11/2006 | Brener et al. |
| 2006/0260958 | A1 | 11/2006 | Brunner |
| 2007/0067177 | A1 | 3/2007 | Martin |
| 2007/0094024 | A1 | 4/2007 | Kristensson et al. |
| 2007/0106937 | A1 | 5/2007 | Cucerzan et al. |
| 2007/0141544 | A1 | 6/2007 | Nakane |
| 2007/0238084 | A1 | 10/2007 | Maguire et al. |
| 2007/0265831 | A1 | 11/2007 | Dinur et al. |
| 2007/0271089 | A1 | 11/2007 | Bates et al. |
| 2008/0059151 | A1 | 3/2008 | Chen |
| 2008/0077859 | A1 | 3/2008 | Schabes et al. |
| 2008/0154600 | A1 | 6/2008 | Tian et al. |
| 2008/0167858 | A1 | 7/2008 | Christie et al. |
| 2008/0173712 | A1 | 7/2008 | Nemet |
| 2008/0189106 | A1 | 8/2008 | Low et al. |
| 2008/0195940 | A1 | 8/2008 | Gail et al. |
| 2008/0208567 | A1 | 8/2008 | Brockett et al. |
| 2008/0208582 | A1 | 8/2008 | Gallino |
| 2008/0249773 | A1 | 10/2008 | Bejar et al. |
| 2008/0270897 | A1 | 10/2008 | Jawerth et al. |
| 2009/0083028 | A1 | 3/2009 | Davtchev et al. |
| 2009/0198671 | A1 | 8/2009 | Zhang |
| 2009/0228467 | A1 | 9/2009 | Asanuma |
| 2009/0230182 | A1 | 9/2009 | Nemet et al. |
| 2009/0302102 | A1 | 12/2009 | Nemet et al. |
| 2009/0319257 | A1 | 12/2009 | Blume et al. |
| 2009/0320742 | A1 | 12/2009 | Leute et al. |
| 2010/0020970 | A1 | 1/2010 | Liu |
| 2010/0050074 | A1 | 2/2010 | Nachmani et al. |
| 2010/0219235 | A1 | 9/2010 | Nemet et al. |
| 2010/0269454 | A1 | 10/2010 | Reddersen et al. |
| 2010/0275118 | A1 | 10/2010 | Iakobashvili et al. |
| 2010/0286979 | A1 | 11/2010 | Zangvil et al. |
| 2011/0006109 | A1 | 1/2011 | Nemet |
| 2011/0006115 | A1 | 1/2011 | Nemet |
| 2011/0093268 | A1 | 4/2011 | Gorin et al. |
| 2011/0184720 | A1 | 7/2011 | Zangvil |
| 2012/0104105 | A1 | 5/2012 | Nemet |
| 2012/0104106 | A1 | 5/2012 | Nemet |
| 2012/0145781 | A1 | 6/2012 | Nemet |
| 2012/0305637 | A1 | 12/2012 | Nemet |
| 2013/0024185 | A1 | 1/2013 | Parikh |
| 2013/0074248 | A1 | 3/2013 | Evans et al. |
| 2013/0138641 | A1 | 5/2013 | Korolev et al. |
| 2013/0334301 | A1 | 12/2013 | Nemet et al. |
| 2014/0001256 | A1 | 1/2014 | Nemet et al. |
| 2014/0110486 | A1 | 4/2014 | Nemet |
| 2014/0252096 | A1 | 9/2014 | Nemet et al. |
| 2014/0353385 | A1 | 12/2014 | Nemet |
| 2014/0360269 | A1 | 12/2014 | Burghardt et al. |
| 2015/0047552 | A1 | 2/2015 | Ortais |
| 2015/0053776 | A1 | 2/2015 | Nemet et al. |
| 2015/0100105 | A1 | 4/2015 | Kiani et al. |
| 2015/0122880 | A1 | 5/2015 | Nemet et al. |
| 2015/0168223 | A1 | 6/2015 | Hammond et al. |
| 2015/0193677 | A1 | 7/2015 | Nemet et al. |
| 2015/0220877 | A1 | 8/2015 | Nemet et al. |
| 2016/0042260 | A1 | 2/2016 | Nemet |
| 2016/0071000 | A1 | 3/2016 | Nemet et al. |
| 2016/0239781 | A1 | 8/2016 | Nemet et al. |
| 2016/0275390 | A1 | 9/2016 | Nemet et al. |
| 2016/0292554 | A1 | 10/2016 | Nemet et al. |
| 2016/0371576 | A1 | 12/2016 | Nemet et al. |
| 2016/0371577 | A1 | 12/2016 | Nemet |
| 2016/0371635 | A1 | 12/2016 | Nemet et al. |
| 2017/0177987 | A1 | 6/2017 | Nemet et al. |

FOREIGN PATENT DOCUMENTS

| | | |
|---|---|---|
| CN | 101365934 | 2/2009 |
| CN | 204176727 | 2/2015 |
| EP | 936753 | 8/1999 |
| JP | S57-59293 | 4/1982 |
| JP | 63094383 | 4/1988 |
| JP | 63-118894 | 5/1988 |
| JP | 3-53281 | 3/1991 |
| JP | 5-6470 | 1/1993 |
| JP | 5-19695 | 1/1993 |
| JP | 5-67253 | 3/1993 |
| JP | 9-504858 | 11/1994 |
| JP | 2006-522933 | 5/1997 |
| JP | 2001-502794 | 2/2001 |
| JP | 2001-194248 | 7/2001 |
| JP | 2002-040012 | 2/2002 |
| JP | 2002/504684 | 2/2002 |
| JP | 2003-203210 | 7/2003 |
| JP | 2003/525464 | 8/2003 |
| JP | 2005-518320 | 6/2005 |
| JP | 2006-18782 | 1/2006 |
| JP | 2007121017 | 5/2007 |
| JP | 2004-184920 | 7/2007 |
| JP | 2008/089673 | 4/2008 |
| WO | 1994/27144 | 11/1994 |
| WO | 1994/27155 | 11/1994 |
| WO | 1997/011535 | 3/1997 |
| WO | 1998/14777 | 4/1998 |
| WO | 1998/035514 | 12/1998 |
| WO | 1999/042822 | 8/1999 |
| WO | 2001/048680 | 7/2001 |
| WO | 2001/064430 | 9/2001 |
| WO | 2003/060626 | 7/2003 |
| WO | 2004/038353 | 5/2004 |
| WO | 2004/038535 | 5/2004 |
| WO | 2004/092697 | 10/2004 |
| WO | 2006-086053 | 8/2006 |
| WO | 2007-049792 | 5/2007 |
| WO | 2008/022140 | 2/2008 |
| WO | 09/016631 | 2/2009 |
| WO | 2007/129316 | 4/2009 |
| WO | 2008/135962 | 4/2009 |
| WO | 2009/063464 | 5/2009 |
| WO | 2009/063465 | 5/2009 |

(56) References Cited

FOREIGN PATENT DOCUMENTS

| WO | 2009-144701 | 12/2009 |
|---|---|---|
| WO | 2009/150641 | 12/2009 |
| WO | 10/013228 | 2/2010 |
| WO | 2010/134061 | 11/2010 |
| WO | 2010/134062 | 11/2010 |
| WO | 2016/185474 | 11/2016 |
| WO | 2006/134795 | 12/2016 |
| WO | 2017/006326 | 1/2017 |

OTHER PUBLICATIONS

An Office Action dated Oct. 11, 2016, which issued during the prosecution of U.S. Appl. No. 15/184,483.
A Notice of Allowance dated Nov. 18, 2014, which issued during the prosecution of U.S. Appl. No. 13/323,906.
A Notice of Allowance dated Apr. 23, 2014, which issued during the prosecution of U.S. Appl. No. 13/323,906.
An Office Action dated May 5, 2016, which issued during the prosecution of Canadian Patent Application No. 2,762,894.
A Notice of Allowance dated Apr. 25, 2014, which issued during the prosecution of U.S. Appl. No. 13/490,705.
A Notice of Allowance dated Nov. 7, 2014, which issued during the prosecution of U.S. Appl. No. 13/490,705.
An English translation of an Office Action dated Feb. 3, 2014 which issued during the prosecution of Japanese Patent Application No. 2012-511407.
An English translation of an Office Action dated Aug. 26, 2014 which issued during the prosecution of Japanese Patent Application No. 2012-511407.
An Office Action dated Mar. 6, 2015, which issued during the prosecution of U.S. Appl. No. 14/055,422.
An English translation of an Office Action dated Jun. 25, 2013 which issued during the prosecution of Japanese Patent Applicaton No. 2012-511406.
An Office Action dated Nov. 7, 2012, which issued during the prosecution of U.S. Appl. No. 12/743,209.
An English Translation of an Office Action dated Dec. 24, 2013 which issued during the prosecution of Chinese Patent Applicaton No. 200980160387.4.
An Office Action dated Mar. 9, 2012, which issued during the prosecution of U.S. Appl. No. 12/743,209.
Notice of Allowance dated Apr. 14, 2014, which issued during the prosecution of U.S. Appl. No. 13/657,185.
An Office Action dated Jan. 16, 2013, which issued during the prosecution of U.S. Appl. No. 12/598,979.
An Office Action dated Dec. 19, 2012, which issued during the prosecution of U.S. Appl. No. 12/742,650.
An Office Action dated Mar. 20, 2012, which issued during the prosecution of U.S. Appl. No. 13/321,477.
An Office Action dated Aug. 14, 2015, which issued during the prosecution of U.S. Appl. No. 14/055,422.
An English Translation of an Office Action dated Feb. 26, 2013 which issued during the prosecution of Japanese Patent Application No. JP2009-508663.
An English Translation of an Office Action dated Jan. 15, 2013 which issued during the prosecution of Japanese Patent Application No. JP2010-507054.
An Extended European Search Report dated Feb. 11, 2013, which issued during the prosecution of European Application No. 08848845.
An Extended European Search Report dated Feb. 18, 2013, which issued during the prosecution of European Application No. 09762166.
An Office Action dated Nov. 7, 2011, which issued during the prosecution of U.S. Appl. No. 12/598,979.
An International Preliminary Report on Patentability dated Nov. 22, 2011 which issued during the prosecution of Applicant's PCT/IL10/00205.
U.S. Appl. No. 60/746,646, filed May 7, 2006.
U.S. Appl. No. 60/804,072, filed Jun. 6, 2006.
U.S. Appl. No. 61/231,799, filed Aug. 6, 2009.
U.S. Appl. No. 61/131,644, filed Jun. 10, 2008.
An Office Action dated Oct. 28, 2013, which issued during the prosecution of U.S. Appl. No. 14/017,545.
An Office Action dated Jun. 20, 2008, which issued during the prosecution of U.S. Appl. No. 11/852,911.
An International Search Report and a Written Opinion both dated Jul. 17, 2008, which issued during the prosecution of Applicant's PCTIL2007000547.
An International Preliminary Report on Patentability dated Mar. 10, 2009, which issued during the prosecution of Applicant's PCTIL2007000547.
An International Search Report and a Written Opinion both dated Jan. 9, 2009, which issued during the prosecution of Applicant's PCT/IL2007/001411.
An International Preliminary Report on Patentability dated Nov. 10, 2009, which issued during the prosecution of Applicant's PCT/IL2007/001411.
A Notice of Allowance dated Feb. 15, 2012, which issued during the prosecution of U.S. Appl. No. 12/471,798.
European Search Report dated Aug. 18, 2011, which issued during the prosecution of European Patent Application No. 0 773 6287.
An Office Action dated Apr. 19, 2011, which issued during the prosecution of U.S. Appl. No. 12/469,309.
A Notice of Allowance dated Sep. 9, 2011, which issued during the prosecution of U.S. Appl. No. 12/469,309.
An Office Action dated May 3, 2011, which issued during the prosecution of U.S. Appl. No. 12/471,798.
An International Search Report and a Written Opinion both dated Aug. 31, 2009, which issued during the prosecution of Applicant's PCT/IL2009/00503.
An International Preliminary Report on Patentability dated Dec. 13, 2010, which issued during the prosecution of Applicant's PCT/IL2009/000503.
An International Search Report and a Written Opinion both dated Apr. 5, 2010, which issued during the prosecution of Applicant's PCT/IL2009/001167.
An International Preliminary Report on Patentability dated Nov. 22, 2011, which issued during the prosecution of Applicant's PCT/IL2009/001167.
A Notice of Allowance dated Apr. 2, 2013, which issued during the prosecution of U.S. Appl. No. 12/743,209.
An English Translation of an Office Action dated May 22, 2015 which issued during the prosecution of Chinese Patent Application No. 200980160387.4.
An Office Action dated Sep. 10, 2013, which issued during the prosecution of U.S. Appl. No. 13/657,185.
An English translation of an Office Action dated Sep. 10, 2013 which issued during the prosecution of Japanese Patent Application No. 2011-513110.
An English translation of an Office Action dated Aug. 27, 2013 which issued during the prosecution of Japanese Patent Application No. 2010-507054.
An Examiner Interview Summary Report dated Nov. 7, 2008, which issued during the prosecution of U.S. Appl. No. 11/852,911.
A Notice of Allowance dated Feb. 25, 2009, which issued during the prosecution of U.S. Appl. No. 11/852,911.
An Office Action dated Mar. 15, 2013, which issued during the prosecution of U.S. Appl. No. 13/321,467.
A Notice of Allowance dated Jul. 11, 2013, which issued during the prosecution of U.S. Appl. No. 13/321,477.
An Office Action dated Jul. 12, 2013, which issued during the prosecution of European Patent Application No. 07736287.9.
A Notice of Allowance dated May 16, 2013, which issued during the prosecution of U.S. Appl. No. 12/742,650.
An Office Action dated Sep. 18, 2014, which issued during the prosecution of U.S. Appl. No. 14/143,827.
A Notice of Allowance dated Oct. 15, 2014, which issued during the prosecution of U.S. Appl. No. 14/017,545.
A Notice of Allowance dated Apr. 17, 2009, which issued during the prosecution of U.S. Appl. No. 11/852,911.

(56) References Cited

OTHER PUBLICATIONS

An Office Action dated Sep. 9, 2011, which issued during the prosecution of U.S. Appl. No. 12/471,798.
An Office Action dated Oct. 12, 2012, which issued during the prosecution of U.S. Appl. No. 12/669,175.
An Office Action dated Aug. 5, 2013, which issued during the prosecution of U.S. Appl. No. 12/669,175.
An Office Action dated Feb. 5, 2013, which issued during the prosecution of U.S. Appl. No. 12/669,175.
An Office Action dated Mar. 7, 2014, which issued during the prosecution of U.S. Appl. No. 12/669,175.
A Notice of Allowance dated Aug. 4, 2014, which issued during the prosecution of U.S. Appl. No. 12/669,175.
An English Translation of an Office Action dated Apr. 22, 2014 which issued during the prosecution of Israeli Patent Application No. 205687.
An English Translation of an Office Action dated Oct. 27, 2014 which issued during the prosecution of Israeli Patent Application No. 209901.
A Notice of Allowance dated Dec. 14, 2016, which issued during the prosecution of U.S. Appl. No. 15/189,127.
An Office Action dated Jul. 1, 2014, which issued during the prosecution of U.S. Appl. No. 13/576,330.
An International Search Report and a Written Opinion both dated Oct. 3, 2016, which issued during the prosecution of Applicant's PCT/IL2016/050526.
An English Translation of an Office Action dated Jun. 13, 2014 which issued during the prosecution of Chinese Patent Application No. 200880101405.7.
An Office Action dated Nov. 23, 2016, which issued during the prosecution of U.S. Appl. No. 15/063,804.
Letter submitted on Jul. 17, 2009 in U.S. Appl. No. 11/852,911.
A Notice of Allowance dated Oct. 26, 2016, which issued during the prosecution of U.S. Appl. No. 15/189,127.
An Office Action dated May 9, 2013, which issued during the prosecution of U.S. Appl. No. 12/937,618.
An English Translation of an Office Action dated Jan. 25, 2013 which issued during the prosecution of Chinese Patent Application No. 200880101405.7.
Notice of Allowance dated Jan. 5, 2017, which issued during the prosecution of U.S. Appl. No. 15/183,465.
An English Translation of an Office Action dated Apr. 28, 2012 which issued during the prosecution of Chinese Patent Application No. 200880101405.7.
Notice of Allowance dated May 13, 2015, which issued during the prosecution of U.S. Appl. No. 14/461,778.
A Notice of Allowance dated Jun. 27, 2014, which issued during the prosecution of U.S. Appl. No. 14/017,545.
A Supplementary European Search Report dated Jul. 5, 2012, which issued during the prosecution of European Patent Application No. 08789727.
An English Translation of an Office Action dated Jun. 23, 2011 which issued during the prosecution of Chinese Patent Application No. 200880101405.7.
An International Search Report and a Written Opinion both dated May 25, 2011, which issued during the prosecution of Applicant's PCT/IL2011/00088.
An International Search Report dated May 11, 2009, which issued during the prosecution of Applicant's PCT/IL2009/00130.
An International Search Report dated Jun. 26, 2009, which issued during the prosecution of Applicant's PCT/IL2009/00317.
An International Preliminary Examination Report dated Oct. 19, 2010, which issued during the prosecution of Applicant's PCT/IL2009/00317.
Bick, E., "A Constraint Grammar Based Spellchecker for Danish with a Special Focus on Dyslexics" SKY Journal of Linguistics, vol. 19:2006 (ISSN 1796-279X), pp. 387-396 (retrieved Jan. 12, 2009 from the internet). <URL http://www.ling.helsinki.fi/sky/julkaisut/SKY2006_1/1.6.1.%20BICK.pdf>.
An International Search Report and Written Opinion both dated Feb. 3, 2009 which issued during the prosecution of Applicant's PCT/IL08/01051.
An Office Action dated Jan. 10, 2014, which issued during the prosecution of European Patent Application No. 08848845.
An Office Action dated Jun. 5, 2014, which issued during the prosecution of U.S. Appl. No. 14/017,545.
A Notice of Allowance dated Apr. 26, 2013, which issued during the prosecution of U.S. Appl. No. 12/598,979.
A Supplementary European Search Report dated Apr. 13, 2011, which issued during the prosecution of European Patent Application No. 07827384.
An English Translation of an Office Action dated Feb. 7, 2012 which issued during the prosecution of Japanese Patent Application No. JP2009-508663.
A Supplementary European Search Report dated Aug. 23, 2012, which issued during the prosecution of European Patent Application No. 08849330.9.
An International Preliminary Report on Patentability dated May 18, 2010, which issued during the prosecution of Applicant's PCT/IL2008/001495.
An International Preliminary Report on Patentability dated May 18, 2010, which issued during the prosecution of Applicant's PCT/IL2008/001494.
An International Search Report and a Written Opinion both dated Jun. 3, 2009, which issued during the prosecution of Applicant's PCT/IL2008/001494.
An International Search Report and a Written Opinion both dated Jun. 8, 2010, which issued during the prosecution of Applicant's PCT/IL2010/000205.
An International Search Report and a Written Opinion both dated Mar. 9, 2009, which issued during the prosecution of Applicant's PCT/IL2008/001495.
An Office Action dated Apr. 25, 2012, which issued during the prosecution of U.S. Appl. No. 12/598,979.
An English Translation of an Office Action dated Oct. 25, 2012 which issued during the prosecution of Israeli Patent Application No. 201958.
An Office Action dated Jan. 21, 2015, which issued during the prosecution of U.S. Appl. No. 14/461,778.
An Office Action dated Feb. 11, 2015, which issued during the prosecution of U.S. Appl. No. 13/958,893.
An English Translation of an Office Action dated Feb. 18, 2014 which issued during the prosecution of Japanese Patent Application No. JP2009-508663.
U.S. Appl. No. 60/963,956, filed Aug. 6, 2007.
U.S. Appl. No. 60/959,120, filed Jul. 10, 2007.
An Office Action dated Sep. 25, 2014, which issued during the prosecution of U.S. Appl. No. 14/461,778.
An English Translation of an Office Action dated Nov. 4, 2014 which issued during the prosecution of Chinese Patent Application No. 201080030956.6.
An English Translation of an Office Action dated Apr. 19, 2015 which issued during the prosecution of Israeli Patent Application No. 216396.
An English Translation of an Office Action dated Nov. 15, 2014 which issued during the prosecution of Chinese Patent Application No. 200980160387.4.
An English Translation of an Office Action dated Jan. 6, 2014 which issued during the prosecution of Chinese Patent Application No. 201080030956.6.
An English translation of an Office Action dated Jul. 28, 2015 which issued during the prosecution of Japanese Patent Application No. 2014-125707.
Notice of Allowance dated May 29, 2015, which issued during the prosecution of U.S. Appl. No. 13/958,893.
An Office Action dated Jul. 28, 2015, which issued during the prosecution of U.S. Appl. No. 14/595,412.
U.S. Appl. No. 62/163,193, filed May 18, 2015.
U.S. Appl. No. 62/189,367, filed Jul. 7, 2015.
An English translation of an Office Action dated Aug. 27, 2015 which issued during the prosecution of Japanese Patent Application No. 2014-218223.

(56) References Cited

OTHER PUBLICATIONS

An English Translation of an Office Action dated Dec. 31, 2015 which issued during the prosecution of Israeli Patent Application No. 209901.
An English Translation of an Office Action dated Apr. 20, 2015 which issued during the prosecution of Israeli Patent Application No. 216397.
A Supplementary European Search Report dated Sep. 23, 2015, which issued during the prosecution of European Patent Application No. 10777451.5.
European Search Report dated Sep. 16, 2015, which issued during the prosecution of European Patent Application No. 09844849.
A Notice of Allowance dated Dec. 8, 2015, which issued during the prosecution of U.S. Appl. No. 14/055,422.
A Notice of Allowance dated Jan. 18, 2017, which issued during the prosecution of U.S. Appl. No. 15/137,316.
An Office Action dated Nov. 19, 2013, which issued during the prosecution of European Application No. 07827384.4.
A Notice of Allowance dated Mar. 23, 2016, which issued during the prosecution of U.S. Appl. No. 14/823,758.
A Notice of Allowance dated Feb. 4, 2016, which issued during the prosecution of U.S. Appl. No. 14/595,395.
An Office Action dated Dec. 4, 2015, which issued during the prosecution of U.S. Appl. No. 14/823,758.
A Notice of Allowance dated Feb. 2, 2016, which issued during the prosecution of U.S. Appl. No. 14/595,412.
A Notice of Allowance dated Mar. 16, 2016, which issued during the prosecution of U.S. Appl. No. 14/595,954.
A Notice of Allowance dated Mar. 3, 2016, which issued during the prosecution of U.S. Appl. No. 14/528,186.
A Notice of Allowance dated Oct. 11, 2016, which issued during the prosecution of U.S. Appl. No. 14/823,702.
An English translation of an Office Action dated Jun. 14, 2016 which issued during the prosecution of Japanese Application No. 2014-125707.
An English translation of an Office Action dated Mar. 15, 2016, which issued during the prosecution of Japanese Patent Application No. 2014-218223.
An Office Action dated Jan. 29, 2016, which issued during the prosecution of U.S. Appl. No. 14/595,954.
An Office Action dated Sep. 27, 2016, which issued during the prosecution of U.S. Appl. No. 15/189,127.
An Office Action dated Jun. 27, 2016, which issued during the prosecution of U.S. Appl. No. 14/823,702.
An Office Action dated Jan. 29, 2016, which issued during the prosecution of U.S. Appl. No. 14/528,186.
An Office Action dated Jan. 26, 2016, which issued during the prosecution of Canadian Patent Application No. 2762891.
An International Search Report and a Written Opinion both dated Dec. 12, 2016, which issued during the prosecution of Applicant's PCT/IL2016/050727.
An English translation of an Office Action dated Nov. 2, 2016, which issued during the prosecution of Japanese Patent Application No. 2014-125707.
Notice of Allowance dated Mar. 23, 2017, which issued during the prosecution of U.S. Appl. No. 15/169,851.
Notice of Allowance dated Mar. 20, 2017, which issued during the prosecution of U.S. Appl. No. 15/063,804.
Notice of Allowance dated Aug. 3, 2017, which issued during the prosecution of U.S. Appl. No. 15/398,951.
An Office Action dated Jun. 28, 2017, which issued during the prosecution of U.S. Appl. No. 15/495,022.
An Office Action dated Jul. 27, 2017, which issued during the prosecution of U.S. Appl. No. 15/184,483.
An Office Action dated Jul. 26, 2017, which issued during the prosecution of U.S. Appl. No. 15/486,906.
An Office Action together with the English translation dated Sep. 5, 2017, which issued during the prosecution of Japanese Patent Application No. 2016-200656.
An Office Action dated Sep. 26, 2017, which issued during the prosecution of U.S. Appl. No. 15/488,943.
An English translation of an Office Action dated Dec. 7, 2017 which issued during the prosecution of Japanese Patent Application No. 2014-125707.
An Office Action dated Jan. 2, 2018, which issued during the prosecution of U.S. Appl. No. 15/184,483.

* cited by examiner

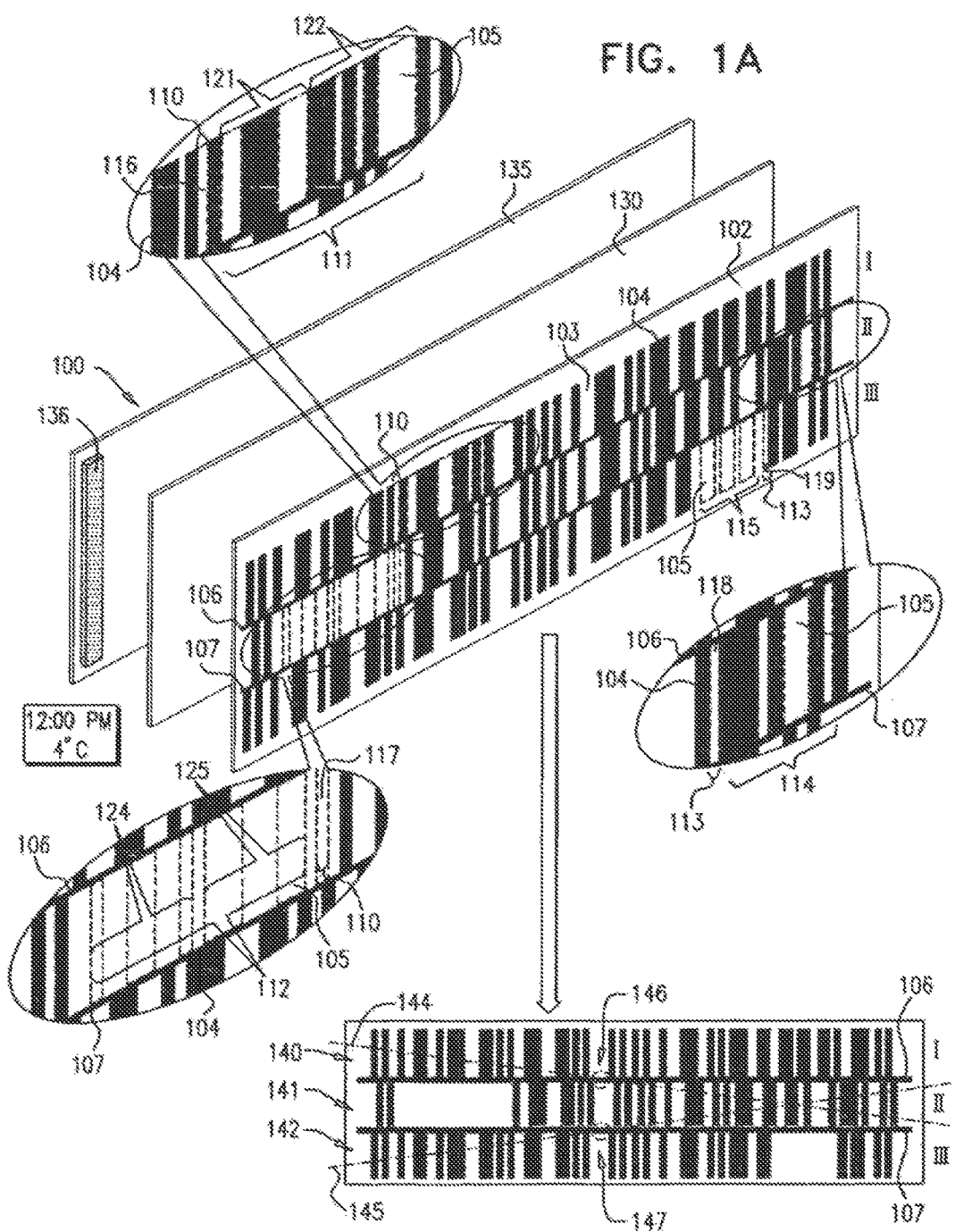

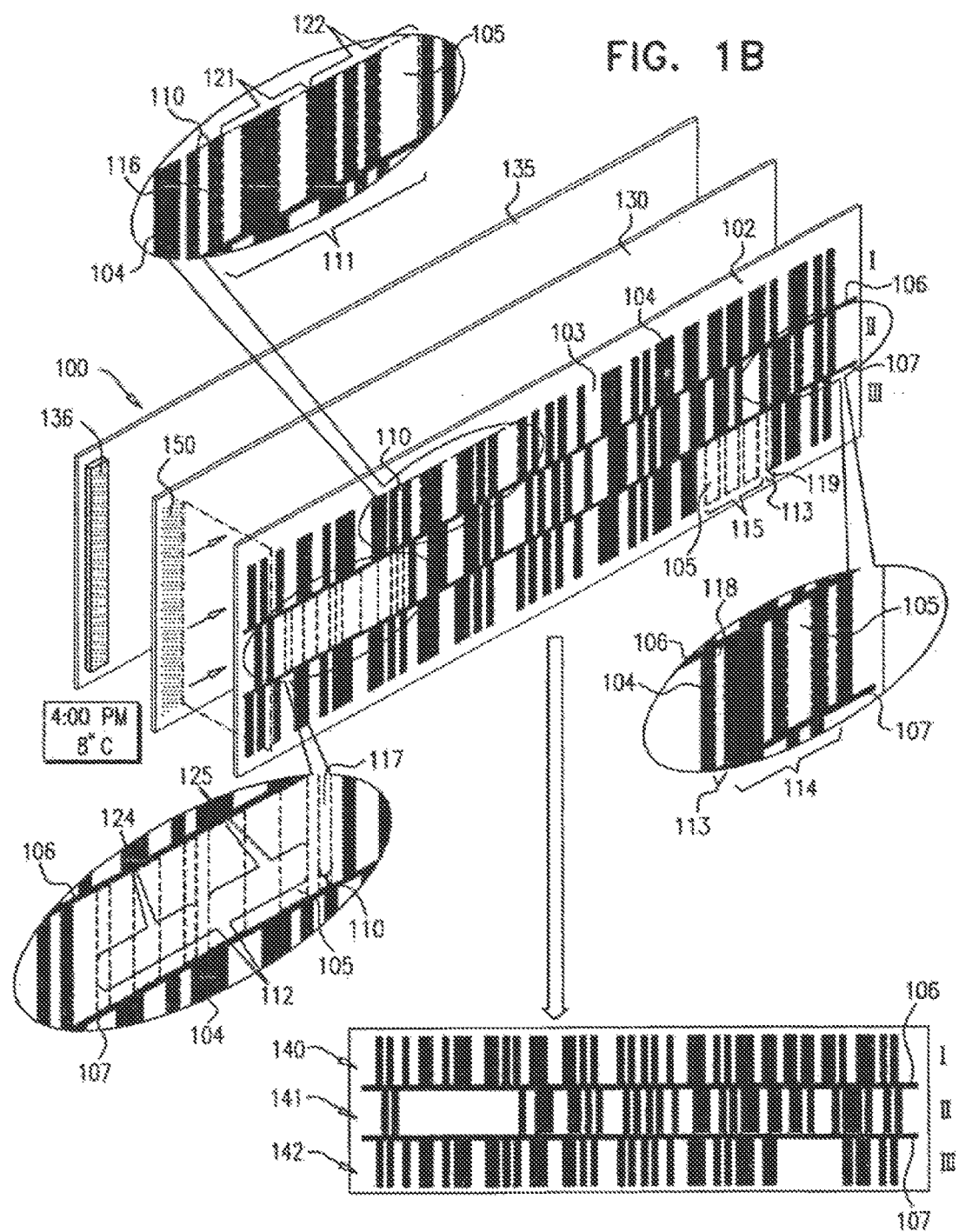

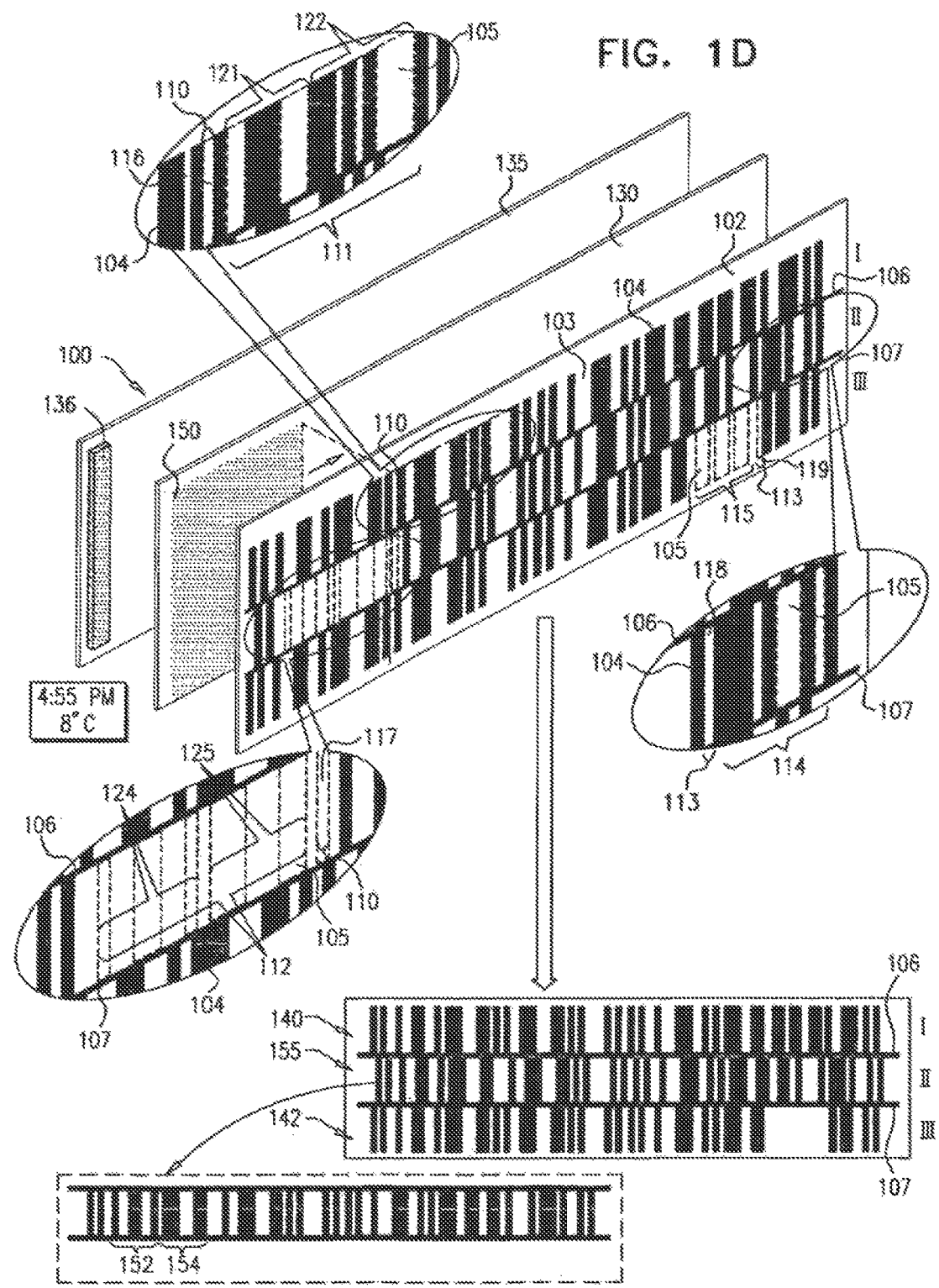

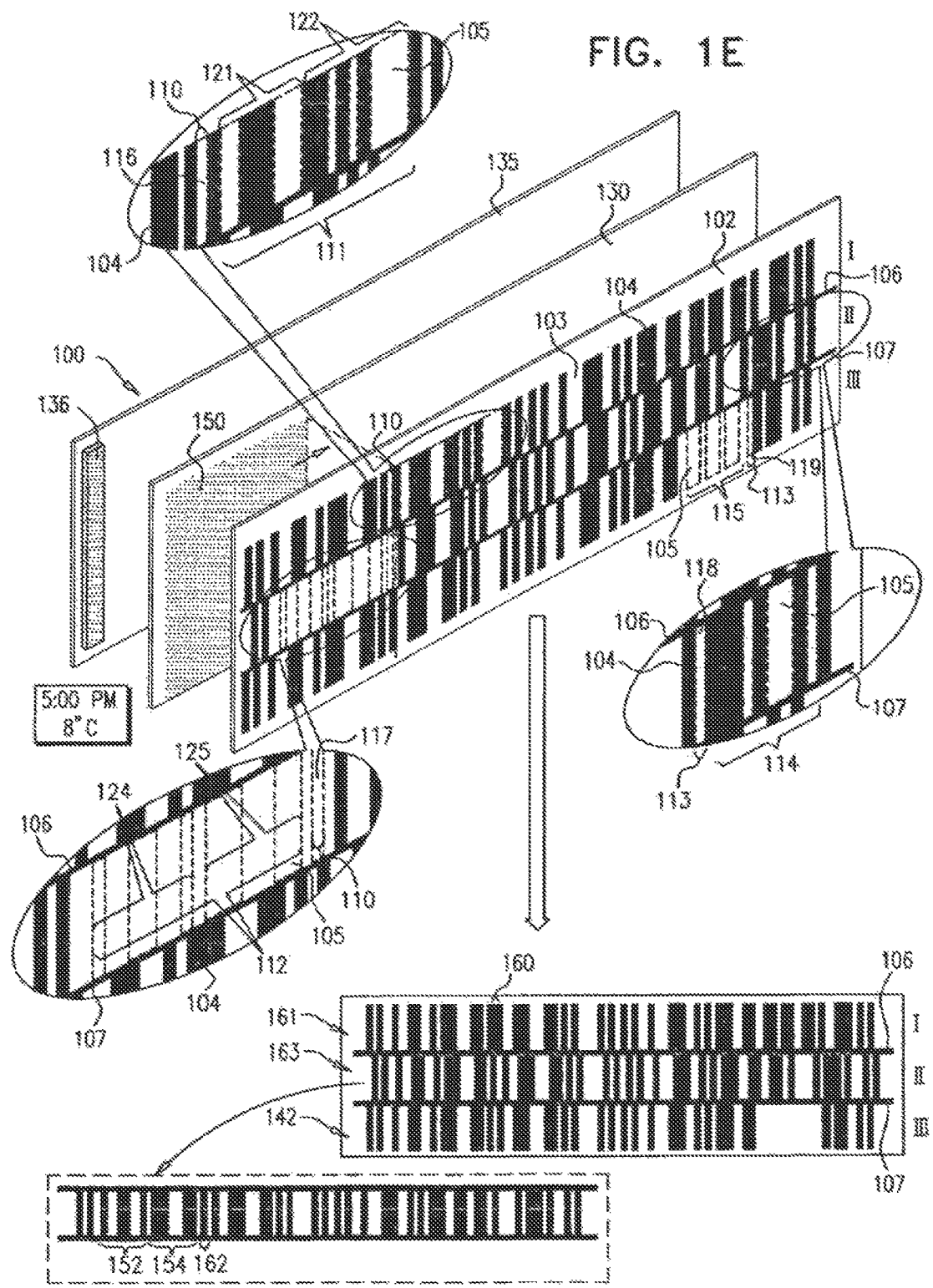

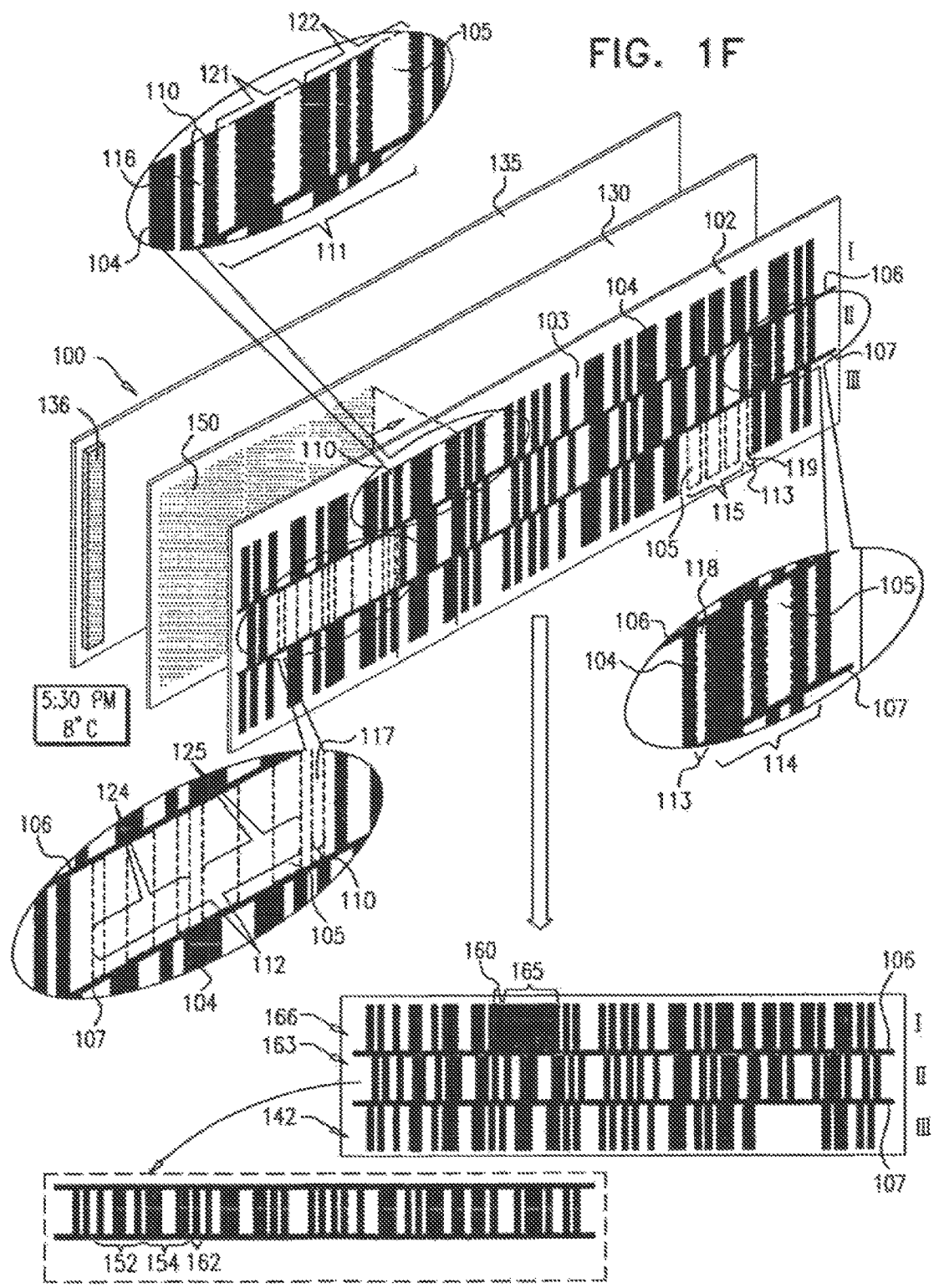

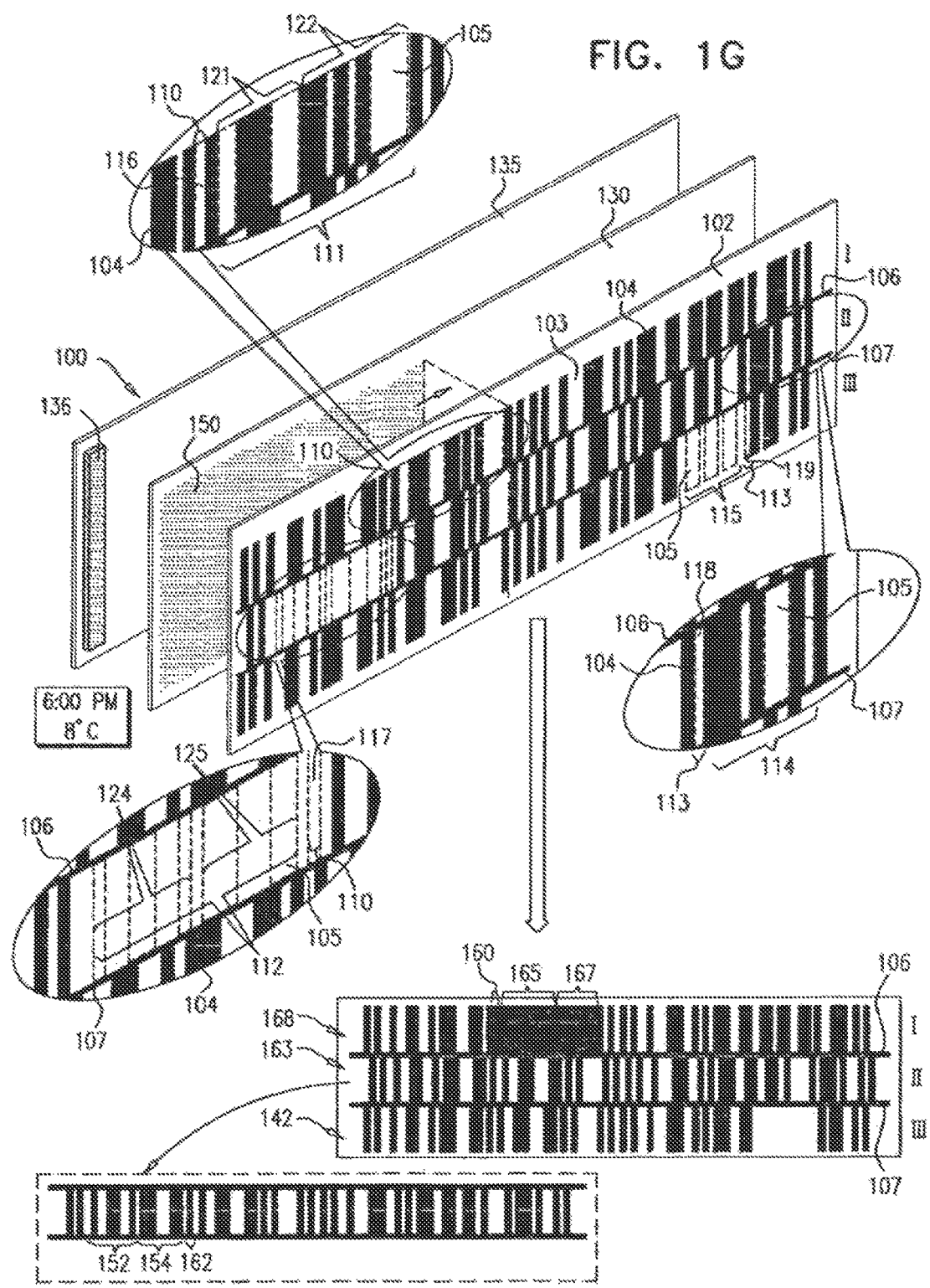

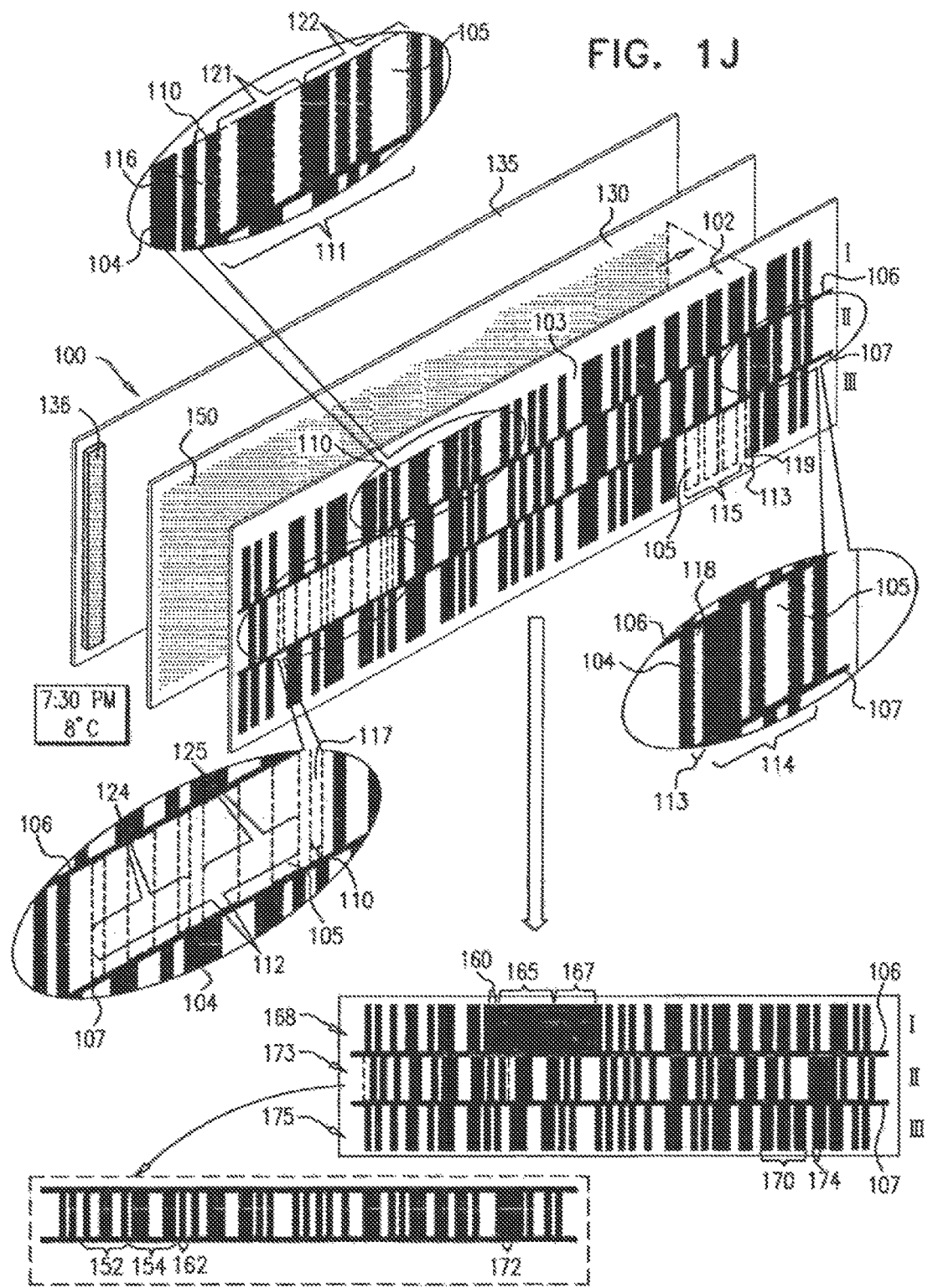

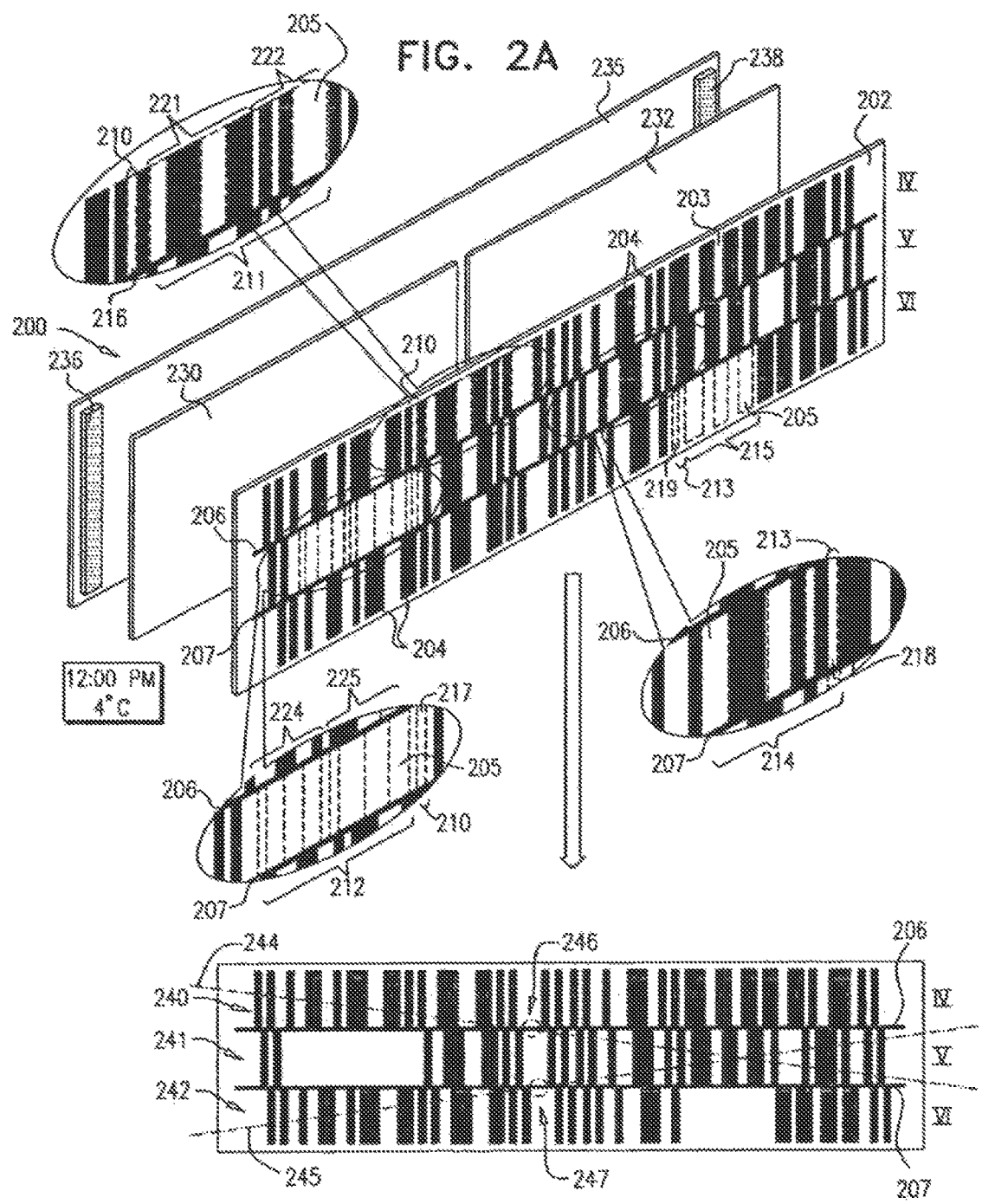

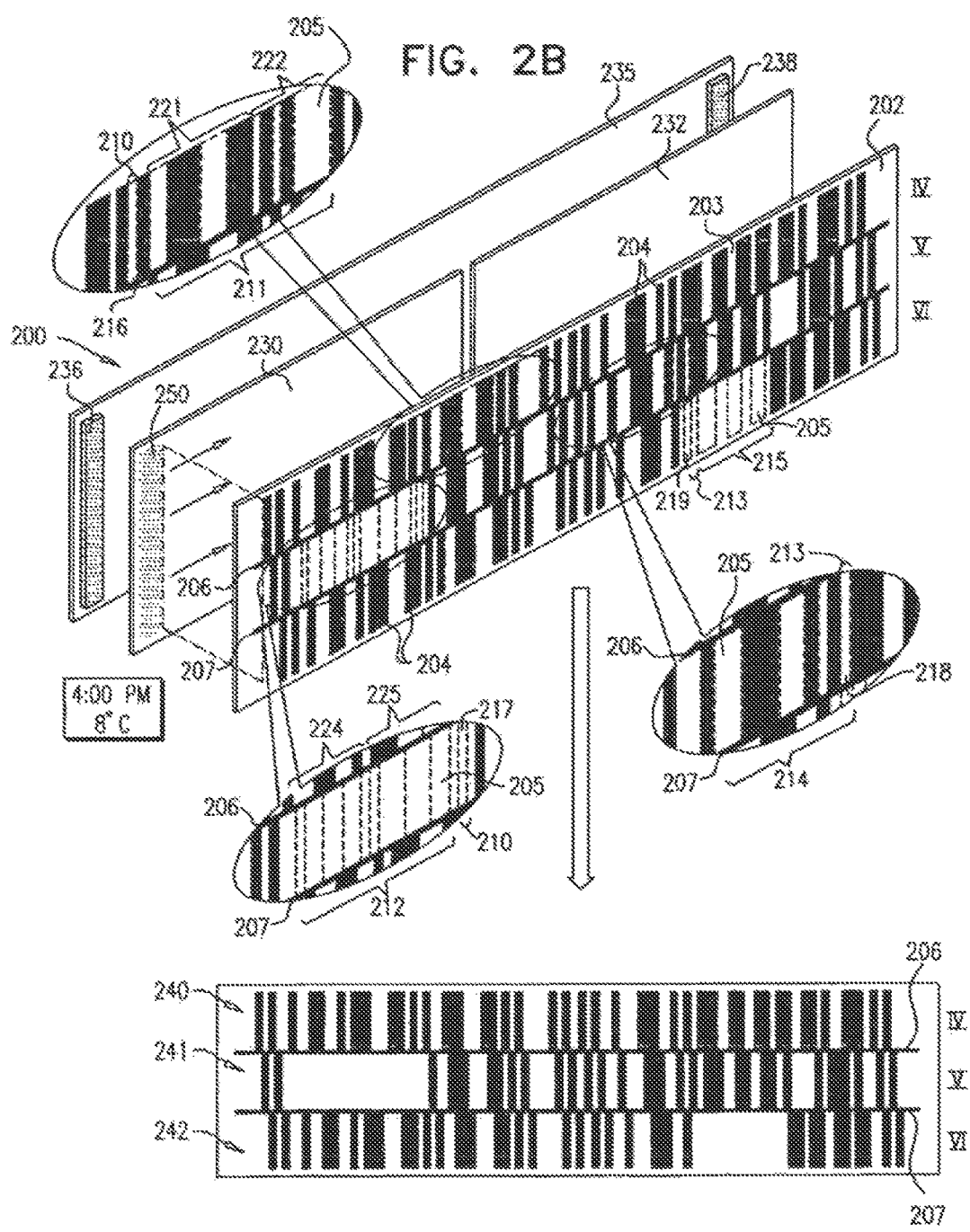

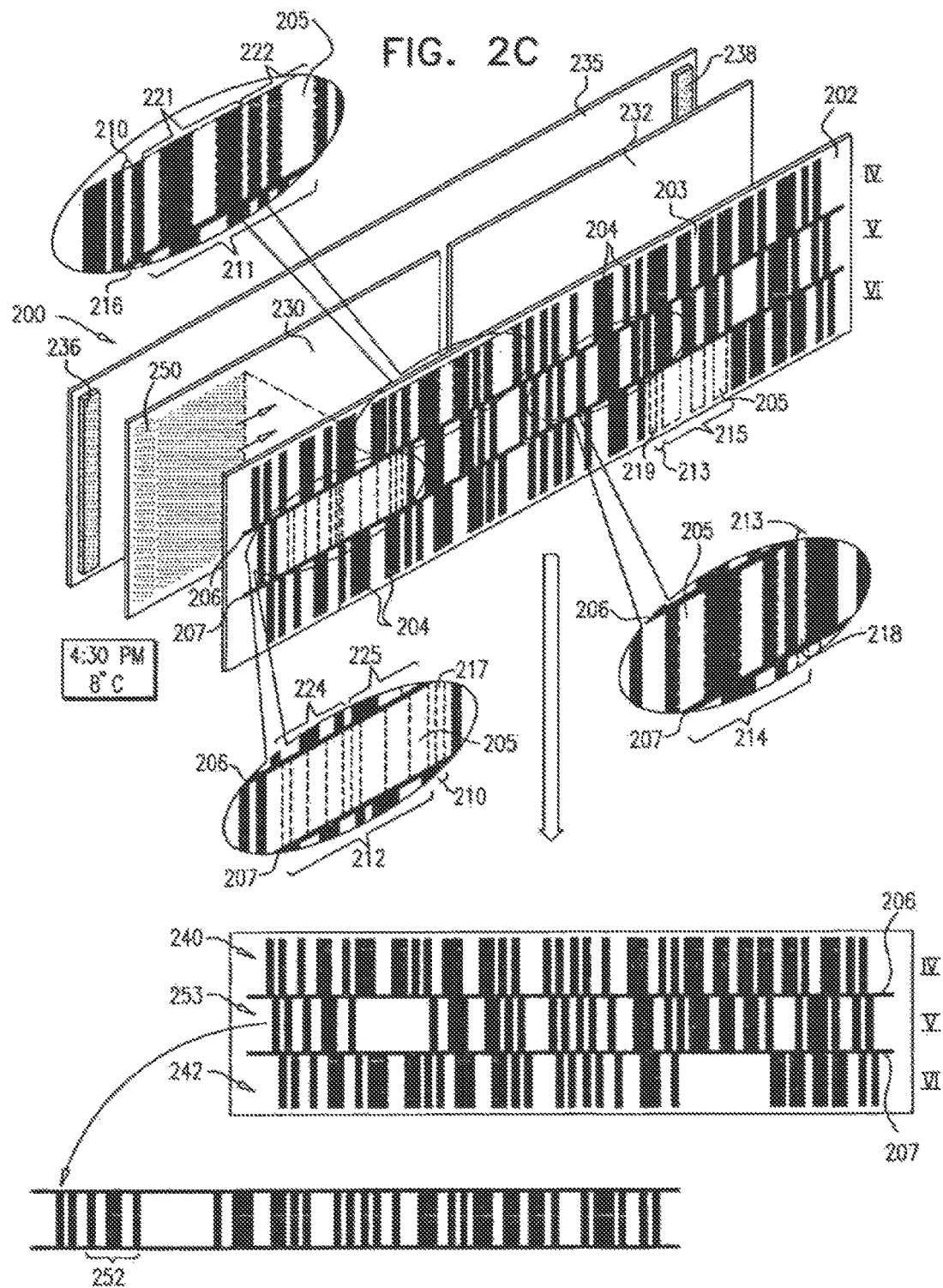

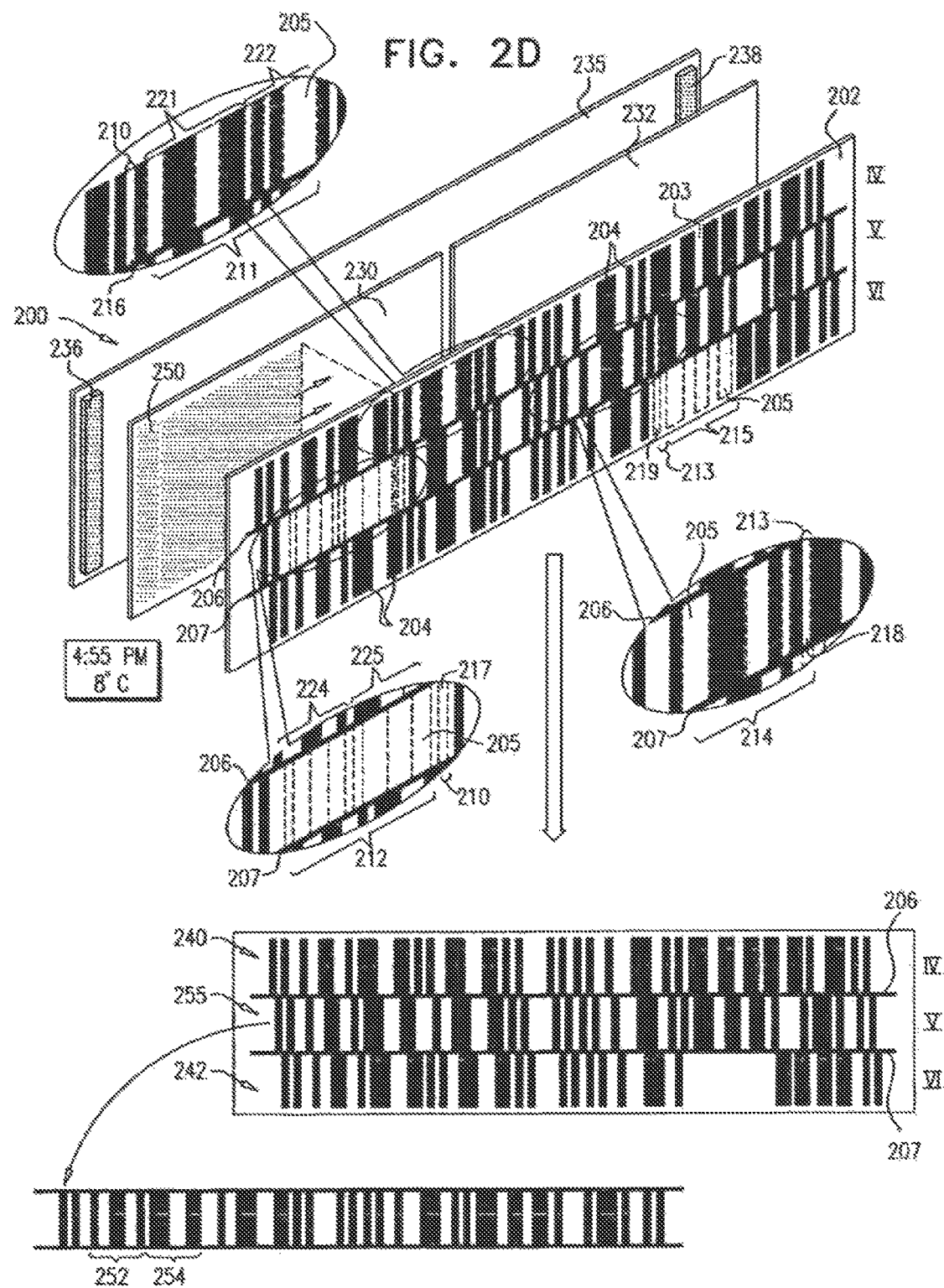

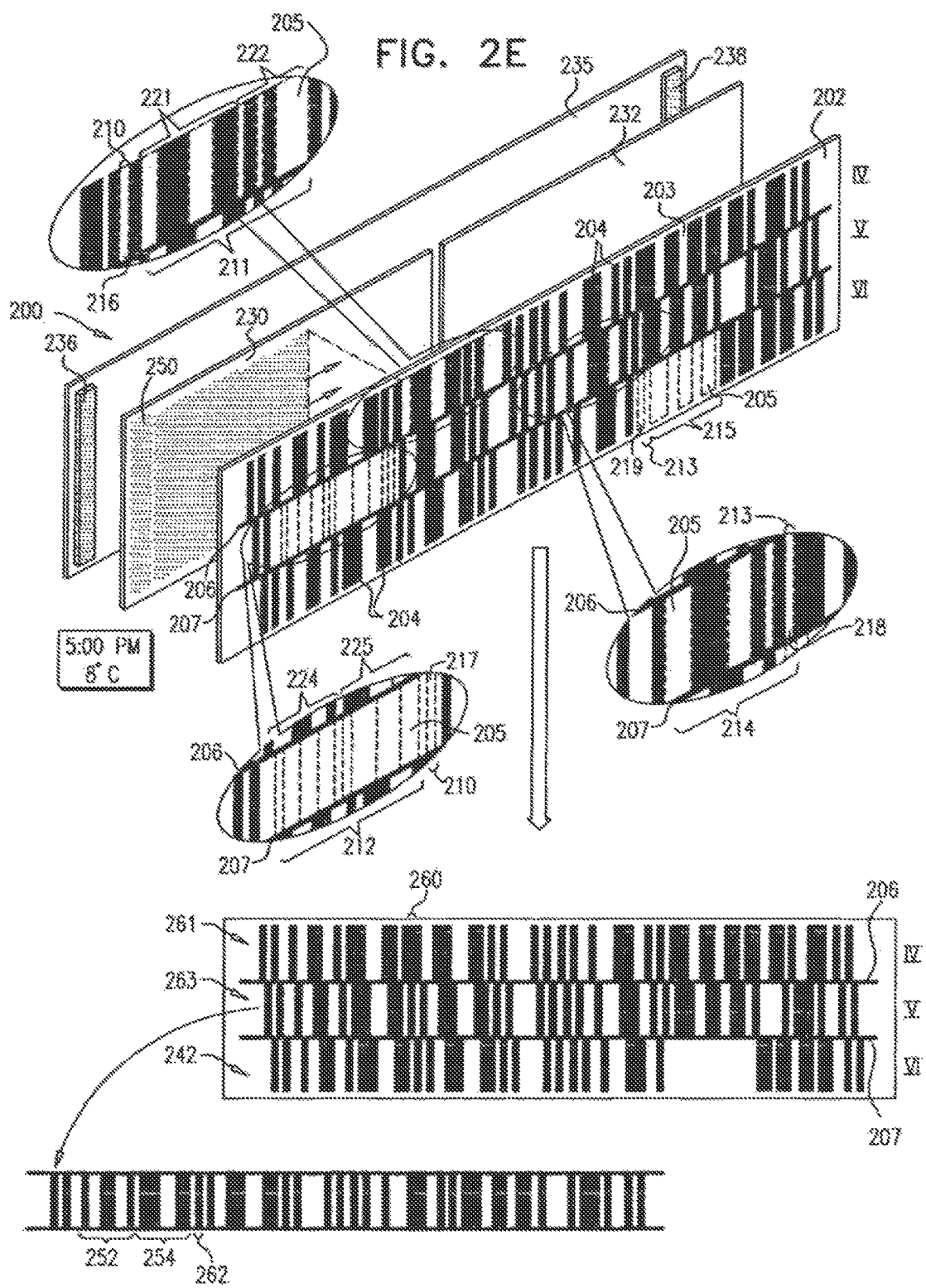

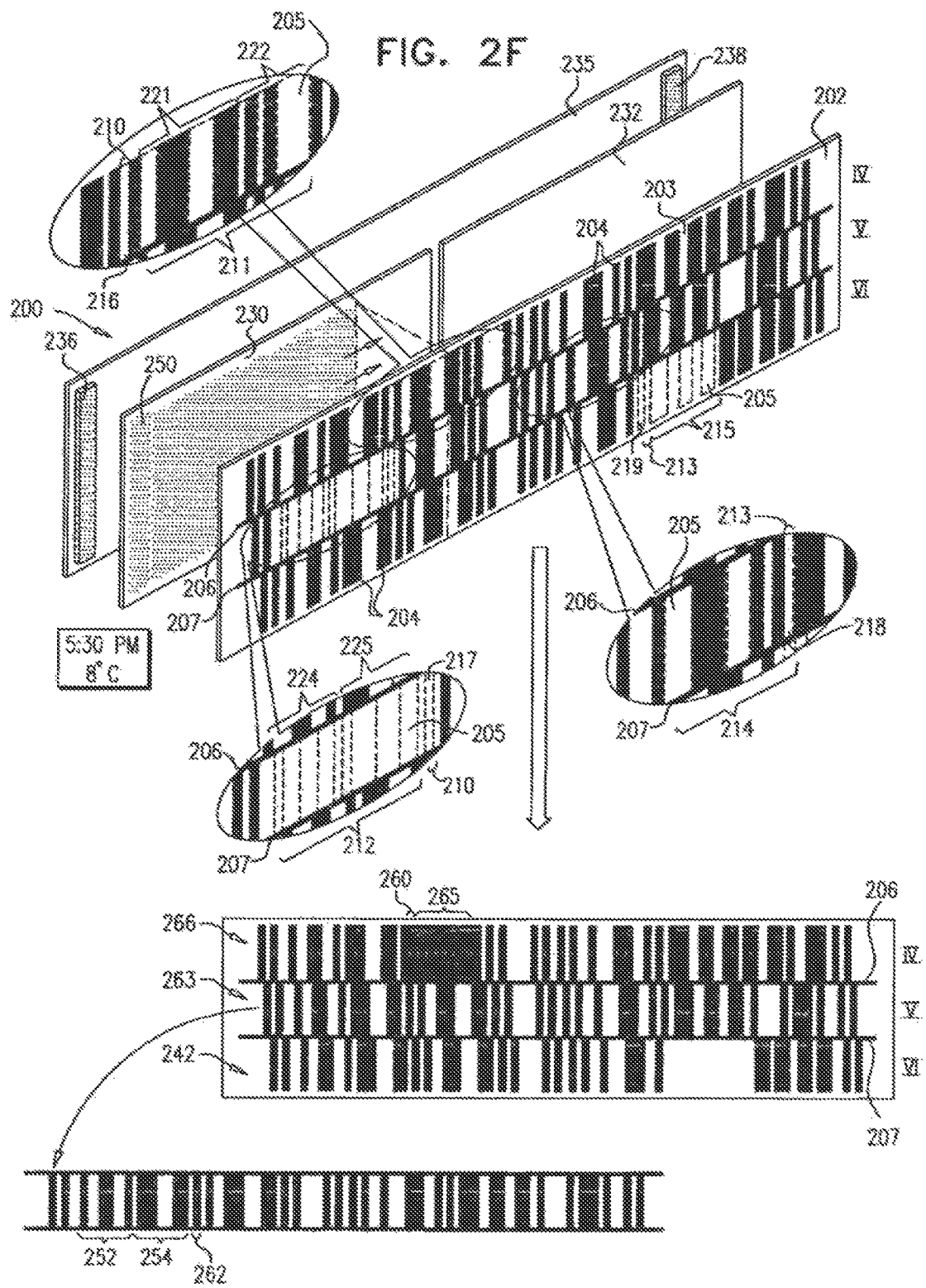

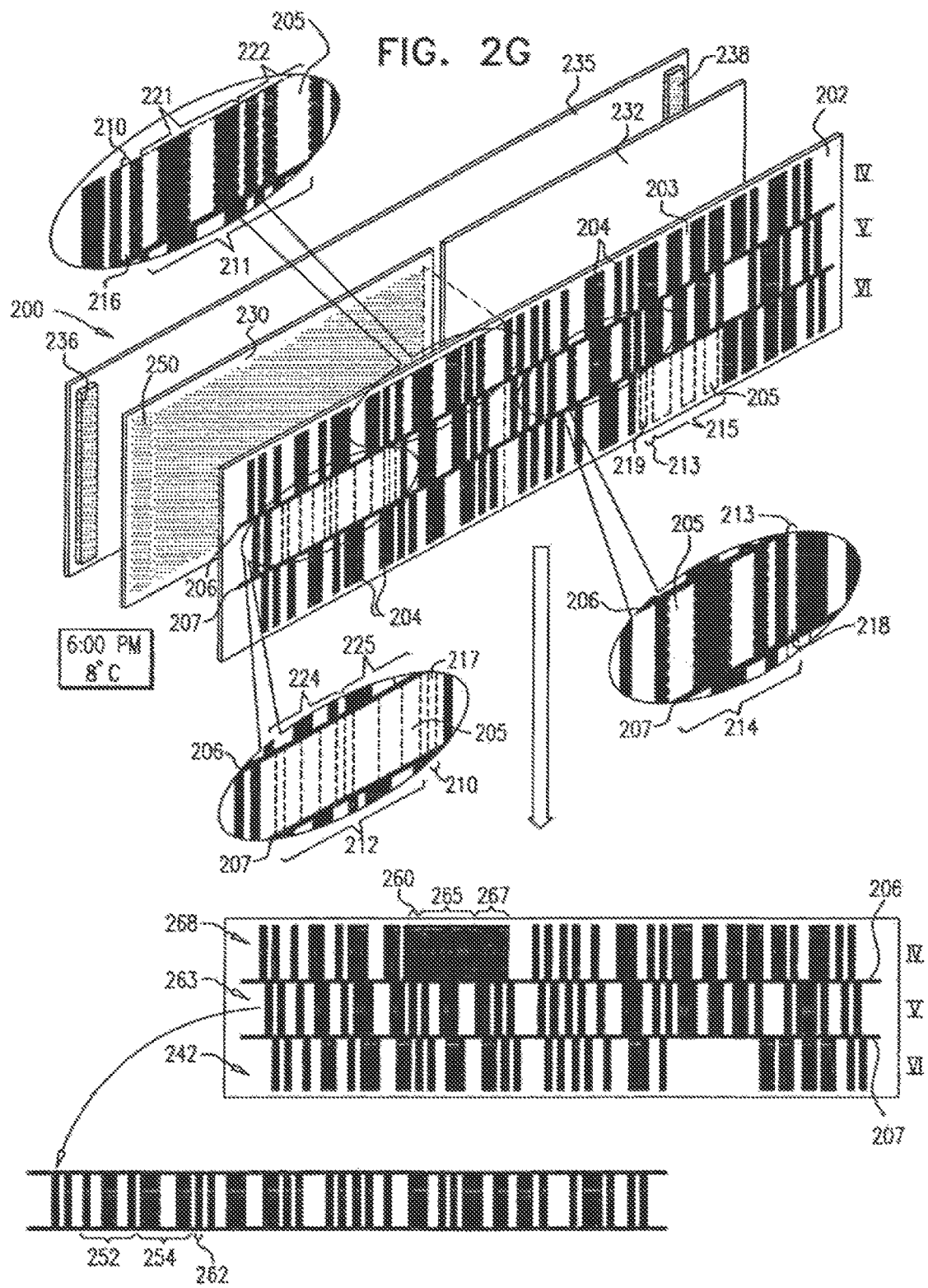

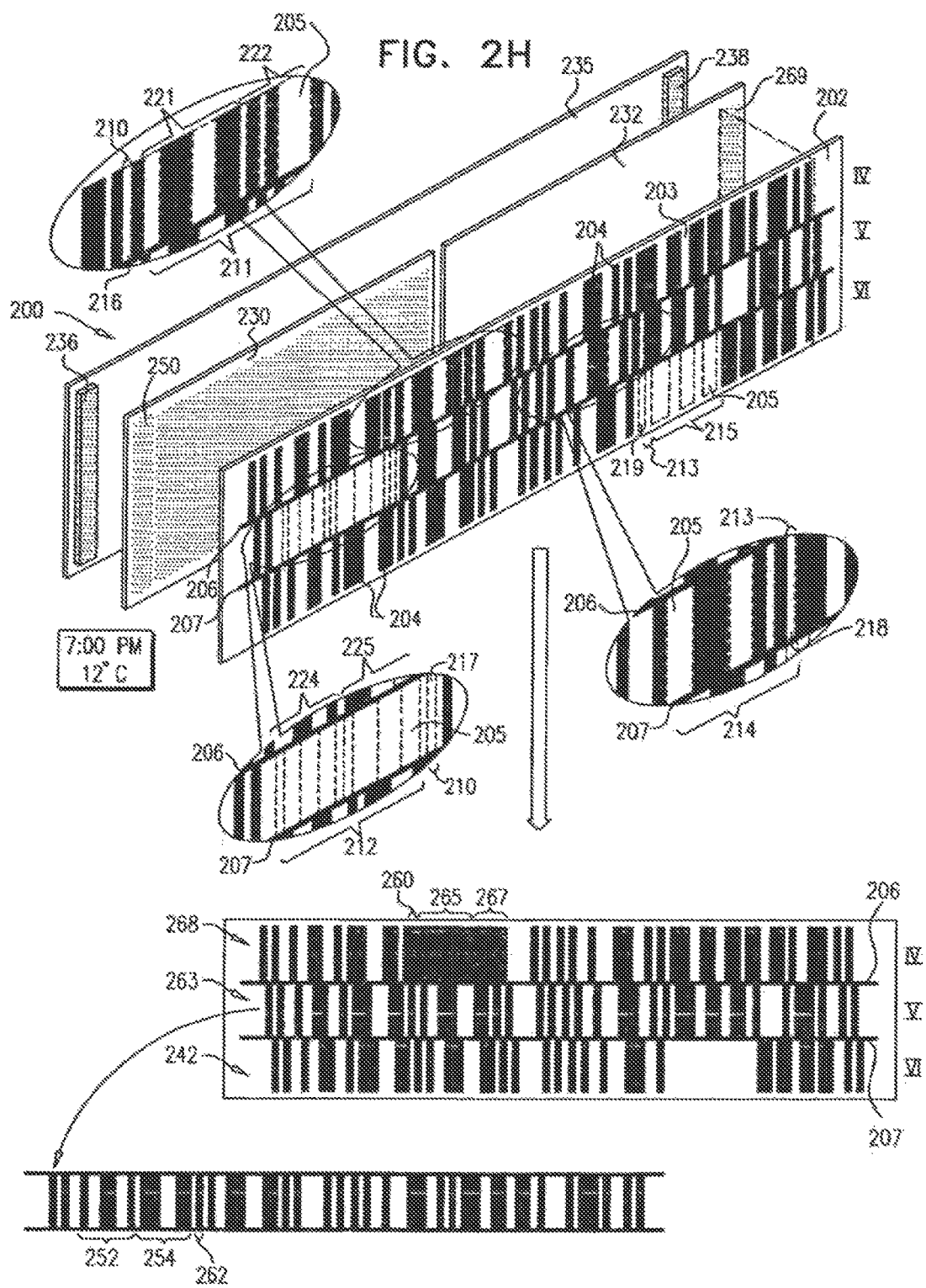

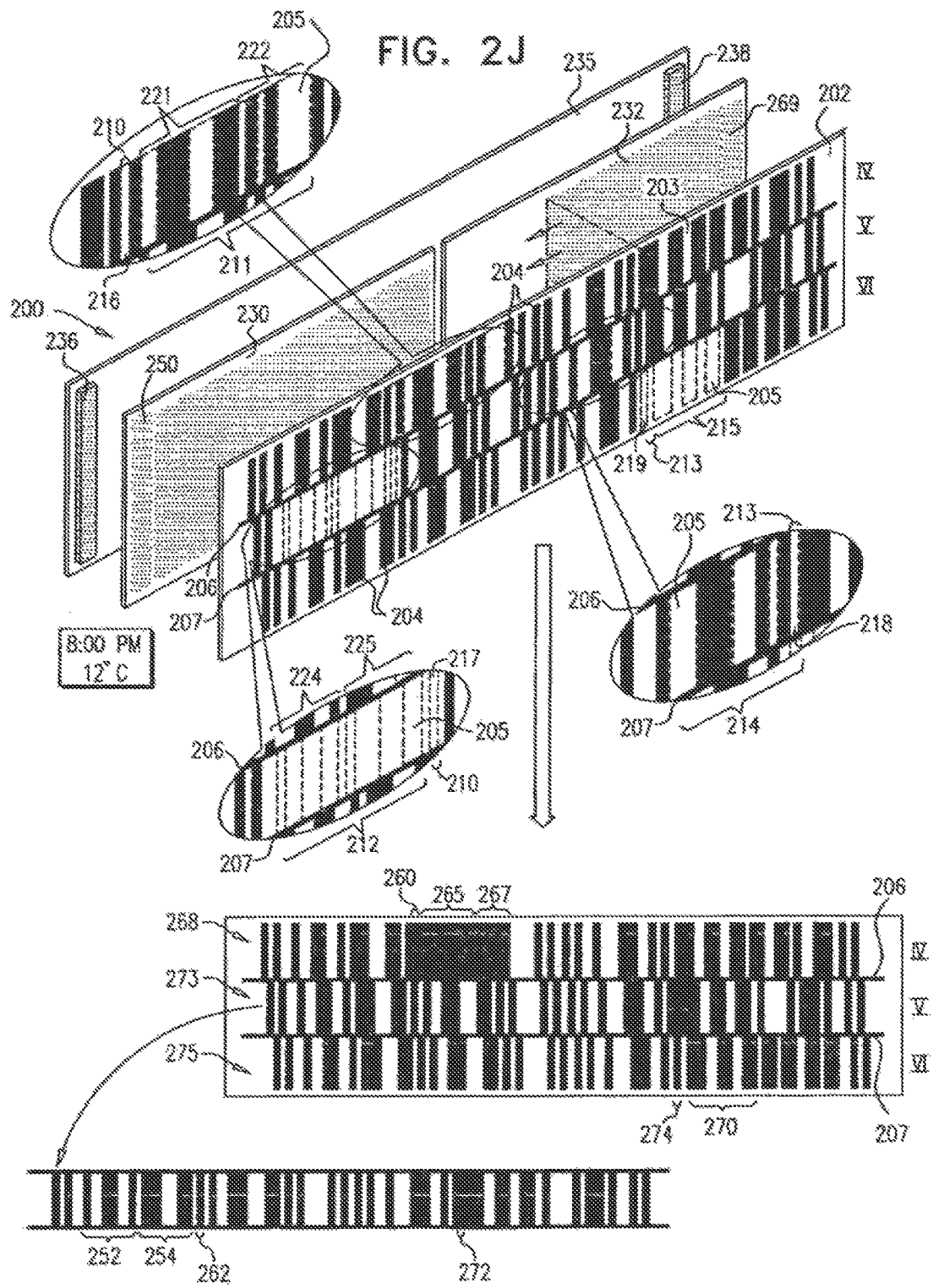

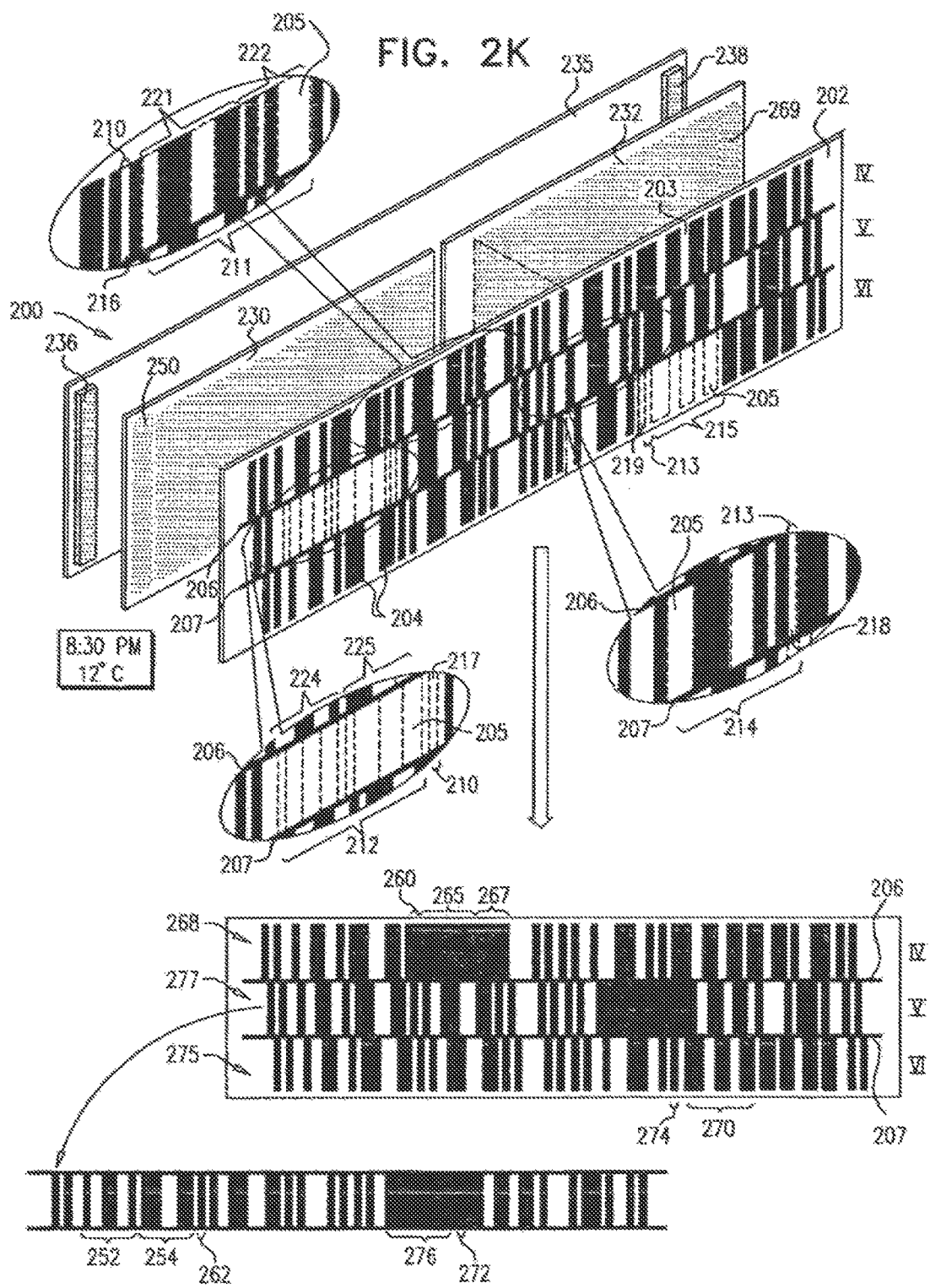

BARCODED INDICATORS FOR QUALITY MANAGEMENT

The present application is a continuation application of U.S. patent application Ser. No. 14/055,422, filed Oct. 16, 2013, entitled BARCODED INDICATORS FOR QUALITY MANAGEMENT, now U.S. Pat. No. 9,317,794, which is a continuation application of U.S. patent application Ser. No. 13/321,477, filed Jan. 17, 2012, entitled BARCODED INDICATORS FOR QUALITY MANAGEMENT, now U.S. Pat. No. 8,579,193, which is a National Phase Application of International Patent Application No. PCT/IL2010/000205, filed Mar. 10, 2010, entitled BARCODED INDICATORS FOR QUALITY MANAGEMENT, which claims priority of International Patent Application No. PCT/IL2009/000503, filed May 20, 2009 and entitled A SYSTEM AND METHOD FOR QUALITY MANAGEMENT UTILIZING BARCODE INDICATORS, from U.S. patent application Ser. No. 12/469,309, filed May 20, 2009 and entitled A SYSTEM AND METHOD FOR QUALITY MANAGEMENT UTILIZING BARCODE INDICATORS, now U.S. Pat. No. 8,091,776, from PCT Patent Application No. PCT/IL2009/001167, filed Dec. 9, 2009 and entitled BARCODE INDICATORS FOR QUALITY MANAGEMENT, and from U.S. Provisional Patent Application Ser. No. 61/231,799, filed Aug. 6, 2009 and entitled BARCODED INDICATORS FOR QUALITY MANAGEMENT, the disclosures of which are hereby incorporated by reference.

REFERENCE TO RELATED APPLICATIONS

Reference is made to U.S. Pat. No. 7,562,811, filed Sep. 10, 2007 and entitled "System And Method For Improved Quality Management In A Product Logistic Chain", to PCT Patent Application No. PCT/IL07/000547, filed May 6, 2007 and entitled "A System And Method For Improved Quality Management In A Product Logistic Chain", to PCT Patent Application No. PCT/IL07/01411, filed Nov. 14, 2007 and entitled "A System And Method For Quality Management Utilizing Barcode Indicators", to PCT Patent Application No. PCT/IL2008/001495, filed Nov. 13, 2008 and entitled "A System And Method For Quality Management Utilizing Barcode Indicators", to PCT Patent Application No. PCT/IL2008/001494, filed Nov. 13, 2008 and entitled "A System And Method For Quality Management Utilizing Barcode Indicators", to PCT Patent Application No. PCT/IL2009/000503, filed May 20, 2009 and entitled "A System And Method For Quality Management Utilizing Barcode Indicators" to U.S. patent application Ser. No. 12/469,309, filed May 20, 2009 and entitled "A System And Method For Quality Management Utilizing Barcode Indicators", to US Provisional Patent Application Ser. No. 61/231,799, filed Aug. 6, 2009 and entitled "Barcoded Indicators For Quality Management" and to PCT Patent Application No. PCT/IL2009/001167, filed Dec. 9, 2009 and entitled "Barcode Indicators for Quality Management", the disclosures of which are hereby incorporated by reference.

Priority is hereby claimed under 37 CFR 1.78(a) (1) and (2)(i) from PCT Patent Application No. PCT/IL2009/000503, filed May 20, 2009 and entitled "A System And Method For Quality Management Utilizing Barcode Indicators", from U.S. patent application Ser. No. 12/469,309, filed May 20, 2009 and entitled "A System And Method For Quality Management Utilizing Barcode Indicators" and from PCT Patent Application No. PCT/IL2009/001167, filed Dec. 9, 2009 and entitled "Barcode Indicators for Quality Management", and under 37 CFR 1.78(a) (4) and (5)(i) from U.S. Provisional Patent Application Ser. No. 61/231,799, filed Aug. 6, 2009 and entitled "Barcoded Indicators For Quality Management".

FIELD OF THE INVENTION

The present invention relates to quality management and to indicators useful in quality management.

BACKGROUND OF THE INVENTION

The following U.S. Patents relate generally to the subject matter of the present application: U.S. Pat. Nos. 6,758,397, 6,009,400, 6,685,094, 7,157,048, 7,156,597 and RE 39,226.

SUMMARY OF THE INVENTION

The present invention seeks to provide improved indicators useful in quality management systems and methodologies.

There is thus provided in accordance with a preferred embodiment of the present invention a barcoded indicator operative to provide a machine-readable indication of exceedance of at least one threshold by at least one product quality affecting parameter, the barcoded indicator including a first barcode including a first plurality of barcode bars and at least one first colorable area, at least a second barcode including a second plurality of barcode bars and at least a second colorable area, and at least one interposed line extending between the first barcode and the at least a second barcode, the at least one interposed line being capable of preventing a barcode reader from reading parts of the first barcode and of the at least a second barcode as part of a single barcode.

Preferably, the first barcode is readable before exceedance of the at least one threshold, the second barcode is unreadable before exceedance of the at least one threshold, and upon exceedance of the at least one threshold the first barcode becomes unreadable as a result of coloring of at least a portion of the at least one first colorable area and generally simultaneously the at least a second barcode becomes readable as a result of coloring of at least a portion of the at least a second colorable area.

Preferably, the at least one first colorable area is initially uncolored and forms part of a first set of initially uncolored, colorable areas positioned at locations between bars of the first barcode when the first barcode is in a first barcode readable state prior to exceedance of the at least one threshold, the at least a second colorable area is initially uncolored and forms part of a second set of initially uncolored, colorable areas positioned at locations of bars of the second barcode which appear only when the second barcode is in a second barcode readable state following exceedance of the at least one threshold, the at least a second barcode is in a second barcode unreadable state prior to exceedance of the at least one threshold, and as a result of the second set being uncolored, more than a single narrow barcode bar is missing from the at least a second barcode.

Preferably, the first set of colorable areas continues to be colored following exceedance of the at least one threshold. Additionally or alternatively, colorable areas forming part of at least one of the first set of colorable areas and the second set of colorable areas become colored sequentially.

Preferably, the at least one interposed line appears in the same color as at least one of the first and the second pluralities of barcode bars.

Preferably, the at least one interposed line extends along the entire length of the first and the second barcodes.

Preferably, the barcoded quality indicator further includes a coloring agent located at a first location on the indicator and a coloring agent pathway operative to allow the coloring agent to move, at a rate which is at least partially a function of time, from the first location to the first and second colorable areas for coloring thereof.

Additionally, the coloring agent pathway is operative to allow the coloring agent to move by diffusing from the first location to the first and the second colorable areas. Preferably, the at least one threshold includes at least one time threshold.

Preferably, the at least one threshold includes at least one time and temperature threshold.

Preferably, the quality indicator is operative to provide indications of exceedance of several different thresholds.

Preferably, the barcoded indicator is operative to provide a machine-readable indication of exceedance of at least one additional threshold by at least one product quality affecting parameter, the barcoded indicator further including at least a third barcode including a third plurality of barcode bars and at least a third colorable area, and at least one additional interposed line extending between the at least a second barcode and the at least a third barcode, the additional interposed line being capable of preventing a barcode reader from reading parts of the at least a second barcode and of the at least a third barcode as part of a single barcode.

Preferably, the at least a third barcode is not readable before exceedance of the at least one additional threshold, and the at least a second barcode includes at least a fourth colorable area, and upon exceedance of the at least one additional threshold the at least a second barcode becomes unreadable as a result of coloring of at least a portion of the at least a forth colorable area and generally simultaneously the at least a third barcode becomes readable as a result of coloring of at least a portion of the at least a third colorable area.

Preferably, the at least a third colorable area is initially uncolored and forms part of a third set of initially uncolored, colorable areas positioned at locations of bars of the at least a third barcode which appear only when the at least a third barcode is in a third barcode readable state following exceedance of the at least one additional threshold, the third barcode is in a third barcode unreadable state prior to exceedance of the at least one additional threshold, as a result of the third set being uncolored, more than a single narrow barcode bar is missing from the at least a third barcode, and the at least a fourth colorable area is initially uncolored and forms part of a fourth set of initially uncolored, colorable areas positioned at locations between bars of the at least a second barcode when the second barcode is in a second barcode readable state prior to exceedance of the at least one additional threshold.

BRIEF DESCRIPTION OF THE DRAWINGS

The present invention will be understood and appreciated more folly from the following detailed description, taken in conjunction with the drawings in which:

FIGS. 1A-1K together are a simplified illustration of the structure and operation of an example of a quality indicator constructed and operative in accordance with a preferred embodiment of the present invention for indicating elapsed time in temperature history;

FIGS. 2A-2K together are a simplified illustration of the structure and operation of another example of a quality indicator constructed and operative in accordance with another preferred embodiment of the present invention for indicating elapsed time in temperature history;

DETAILED DESCRIPTION OF PREFERRED EMBODIMENTS

Figure 1C:
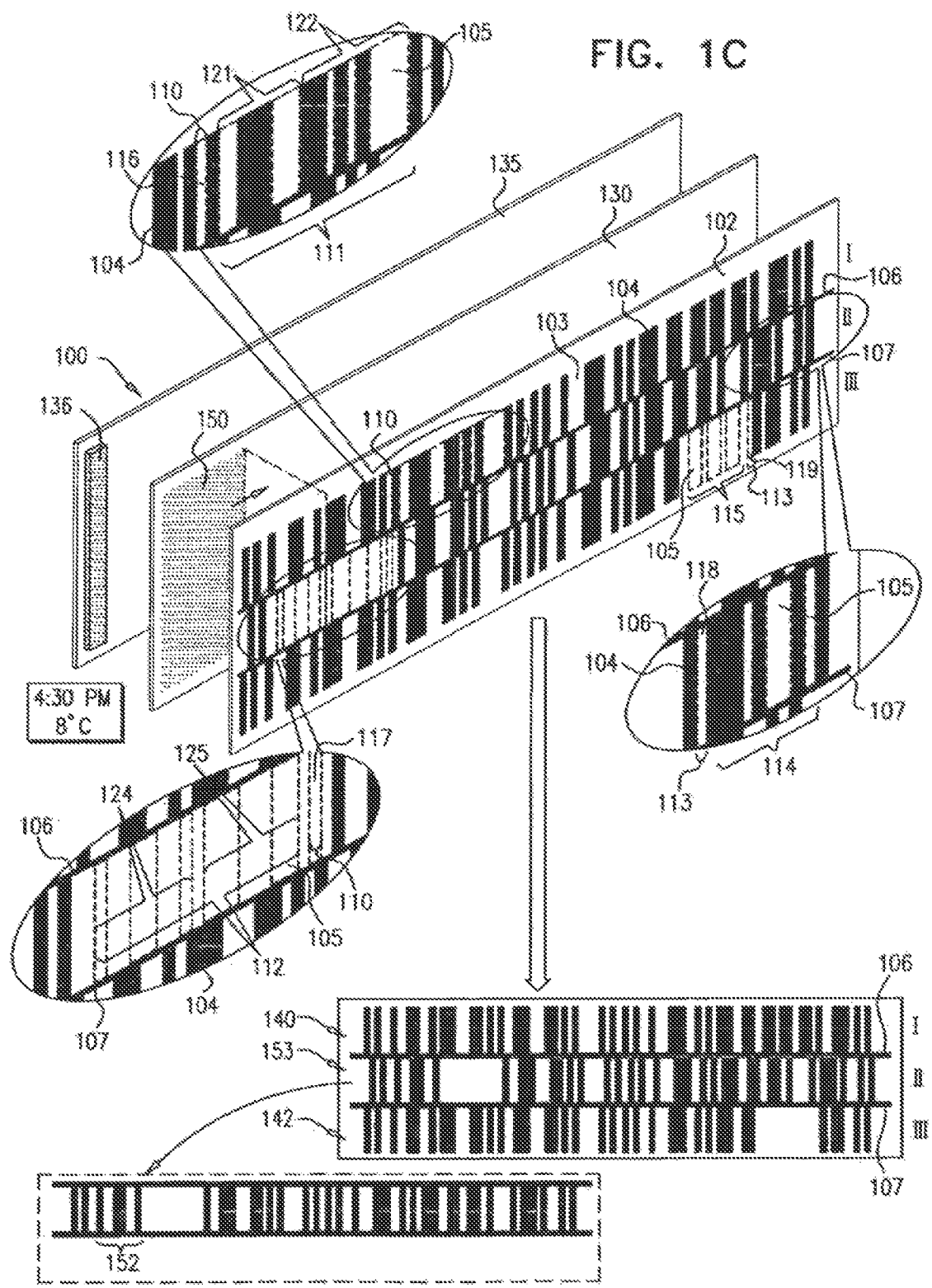

The present invention provides changeable barcode indicators operative to provide a machine-readable, preferably barcode-reader-readable, indication of exceedance of at least one threshold by at least one product quality affecting parameter.

Barcode readers operative to read the barcode indicators and to provide output indications, and product type responsive indication interpreters operative to receive the output indications and to provide human sensible, product quality status outputs are described in U.S. Pat. No. 7,562,811 and in the publications WO/2007/129316, WO/2008/135962, WO/2009/063464 and WO/2009/063465.

The term "barcode" is used herein to refer to a machine-readable optical code. In the examples in the specification, linear, or one-dimensional barcodes are illustrated. It is appreciated that the invention may be applicable to two dimensional barcodes as well.

Each barcode standard includes rules which govern the proper reading of the barcode. A typical barcode includes start indicia representing the start of the barcode, stop indicia representing the end of the barcode and digital indicia representing digits positioned therebetween. Each digit of the barcode is indicated by a series of bars and spaces each having a predetermined width. For example, in the 2 of 5 Interleaved barcode standard, each digit is indicated by two wide bars and three narrow bars. The UPC and the EAN 128 barcode standards include middle indicia with different rules for indicating digits on either side of the middle indicia. Additionally, some barcode standards employ a checksum digit, which is calculated according to a mathematical formula based on the barcode symbol digits and is used as a control for the validity of the barcode.

Accordingly, a readable barcode can be rendered unreadable in several different ways. For example, the series of bars forming the start or the stop indicia can be changed by adding or deleting bars or spaces, or by changing the width thereof. Such a change can cause the barcode reader not to recognize the start or the end of the barcode symbol resulting in the barcode not being readable.

Another possibility is adding or deleting bars or spaces of the digital indicia or changing the width thereof so that a series of bars and spaces indicating a digit no longer indicate a digit according to the standard employed. Yet another possibility is making the above changes to a series of one or more bars and spaces indicating a digit such that a different digit is indicated after the change and calculating the checksum digit including the changed digit results in a checksum digit different from the checksum digit indicated in the barcode, thereby causing the barcode to become invalid. A similar change causing invalidity of the barcode can also be made to the bars indicating the checksum digit itself.

Similarly, an unreadable barcode can be rendered readable by adding or deleting bars or spaces or changing the width thereof. For example, bars forming the start or the stop indicia in a barcode where the start or the end are not properly indicated can be changed as explained above in order to properly form start or stop indicia.

Similarly, an unreadable series of bars can be made to indicate a digit by adding or deleting bars or spaces or changing the width thereof. For example, according to the 2 of 5 Interleaved barcode standard, each digit is indicated by two wide bars and three narrow bars. If, for example, a readable barcode was rendered unreadable by changing a wide bar into a narrow bar, then changing a narrow bar into a wide bar can render the barcode readable. Similarly, if a barcode is unreadable because the checksum digit does not match the other barcode digits, then the bars indicating one of the digits or the checksum digit can be changed as explained above to restore barcode validity.

The quality indicator may incorporate a product code such as an EAN (European Article Number) or a UPC code (Universal Product Code). The examples shown in the description which follows illustrate the use of an EAN code. Alternatively, the quality indicator may incorporate a 2 of 5 interleaved barcode or any other suitable barcode or readable methodology. It is appreciated that bars of one dimensional barcodes correspond to cells in Data Matrix two dimensional barcodes and instead of the "start" and "stop" indicia of one dimensional barcodes, two adjacent borders defining a "finder pattern" are used in the Data Matrix two dimensional barcodes to locate and orient the symbol.

According to a preferred embodiment of the present invention, the quality indicator includes barcodes complying with GS1 (General Specifications) standards, which are outlined at www.gs1.org. According to GS1 standards, the three left-most digits are usually assigned to a country. In Israel, the seven, nine or ten left-most digits, including the country code, represent the supplier's code and the remaining right-most digits are used by each supplier. For example, as seen in the illustrated embodiments of the present application, the three left-most digits are 729, the GS1 country code assigned to Israel. The ten left-most digits, including the country code, represent a supplier's code and the three right-most digits are changeable by the supplier and combinations thereof are used in this application for indicating exceedance of thresholds.

The quality indicator of the present invention includes at least two barcodes preferably arranged in a stacked arrangement, each barcode preferably having at least two visible states.

Preferably, generally at any given time the visible state of only one of the barcodes forming part of an indicator is machine-readable and therefore the indicator presents a single machine-readable barcode generally at any given time. Alternatively, in one or more states of the indicator all of the barcodes forming part thereof may be in visible states which are not machine-readable and the quality indicator does not present a machine-readable barcode at these one or more states.

The phrase "generally at any given time", as defined in this application, means at all times except possibly for short time periods. Preferably, in normal operation, a short time period means a time period of less than fifteen minutes.

The barcodes forming part of an indicator of the present invention are preferably aligned such that the axes thereof are generally parallel to each other. According to an embodiment illustrated in the description and drawings of this application, the bars of one barcode do not lie in registration with the corresponding bars of another barcode but rather are slightly offset with respect to each other. Alternatively, the bars of one barcode lie in registration with the corresponding bars of another barcode.

According to a preferred embodiment of the present invention, the barcodes are juxtaposed to one another such that there is no space between the bars of one barcode and the bars of another barcode.

According to a preferred embodiment illustrated in the description and drawings of the present application, the indicator includes interposed lines which are formed between barcodes and which prevent a barcode reader from erroneously reading parts of multiple barcodes as a single barcode.

Preferably, the interposed lines appear in the same color as barcode bars forming part of the barcodes. Alternatively, the interposed lines appear in a color which prevents erroneous reading of parts of multiple barcodes as a single barcode by a barcode reader. It is appreciated that the interposed lines do not necessarily appear in a dark color and they can appear in a light color.

According to an embodiment illustrated in the description and drawings of the present application, the interposed lines extend along the entire length of the variable barcodes. It is appreciated that the interposed lines need not extend along the entire length of the variable barcodes and they may only extend along a length necessary for preventing a barcode reader from erroneously reading parts of multiple barcodes as a single barcode.

The indicator of the present invention preferably includes at least one group of colorable areas operative to become colored or uncolored at the same time, which is hereinafter referred to as a common colorable region. The common colorable region preferably includes colorable areas forming part of more than a single barcode.

The common colorable region preferably has a width of a single narrow barcode bar. Alternatively, the common colorable region is wider than a single narrow barcode bar.

According to an embodiment illustrated in the description and drawings of the present application, each barcode includes at least one additional set of colorable areas. Each additional set of colorable areas, hereinafter referred to as an additional colorable region, preferably includes at least one colorable area, forms part of a single barcode and is configured to reduce the barcode readability level of the barcode of which it forms a part when the barcode is in an unreadable state. Preferably, an additional colorable region includes more than one colorable area. Alternatively, an additional colorable region includes a single colorable area.

According to another embodiment of the present invention, at least one barcode does not include an additional colorable region.

The phrase "barcode readability level" or "BCR level" of a barcode in an unreadable state reflects the likelihood that a barcode reader will erroneously read the barcode when it is in that unreadable state. Accordingly, an unreadable barcode having a low BCR level is not likely to be erroneously read by a barcode reader.

Reference is now made to FIGS. 1A-1K, which together are a simplified illustration of the construction and operation of one embodiment of a quality indicator for indicating a combination of elapsed time and temperature. The quality indicator described in FIGS. 1A-1K is operative to provide separate indications of exceedance of two different time durations, one hour, and three and a half hours, at a temperature of at least 7 degrees Celsius.

In each of FIGS. 1A-1K, the quality indicator 100 appears both in an exploded view in the middle of the drawing and in a planar view at the bottom portion of the drawing.

As seen in the exploded view in FIGS. 1A-1K, the quality indicator, here indicated by reference numeral 100, preferably includes a barcode defining layer 102, which is preferably printed on a transparent substrate. The printing on the transparent substrate preferably defines a background area 103, which is preferably printed with black ink and overprinted with white ink, a plurality of bars 104 forming part of barcodes I, II and III which are preferably printed with black ink, and a plurality of transparent areas 105, which are preferably printed with light blue ink, such as Pantone No. 645, which has a visual appearance similar to that of the black ink overprinted with white ink. Alternatively, the background area 103 and the plurality of bars 104 are printed in such colors so as to define high contrast therebetween.

The barcodes I, II and III are preferably arranged in a stacked arrangement. The barcodes I and II are preferably separated by an interposed line 106, which is preferably printed on the transparent substrate. The interposed line 106 is preferably generally parallel to the axes of the barcodes. The barcodes II and III are preferably separated by an interposed line 107, which is preferably printed on the transparent substrate. The interposed line 107 is preferably generally parallel to the axes of the barcodes.

The interposed lines 106 and 107 are preferably printed in black ink and extend in the illustrated embodiment throughout the length of the barcodes. Alternatively, the interposed lines 106 and 107 extend as necessary to prevent a barcode reader from reading parts of barcodes I, II and III as a single barcode.

It is appreciated that barcodes I, II and III need not be positioned on the indicator in any particular order.

For the purposes of the present specification and claims, the phrase "transparent areas" is defined so as to include within its scope areas that are either transparent or translucent.

The transparent areas 105 preferably form part of six regions: a common colorable region 110 forming part of barcodes I and II, an additional colorable region 111 forming part of barcode I, an additional colorable region 112 forming part of barcode II, a common colorable region 113 forming part of barcodes II and III, an additional colorable region 114 forming part of barcode II and an additional colorable region 115 forming part of barcode III.

Preferably, the common colorable region 110 includes two transparent areas, transparent area 116 forming part of barcode I and transparent area 117 forming part of barcode II.

Preferably, the common colorable region 113 includes two transparent areas, transparent area 118 forming part of barcode II and transparent area 119 forming part of barcode III.

According to the embodiment illustrated in FIGS. 1A-1K, the additional colorable region 111, forming part of barcode I, appears to the right of the transparent area 116. The transparent area 116 and the transparent areas 105 which form part of the additional colorable region 111 are preferably positioned in spaces between barcode bars forming part of barcode I in its readable state, which is indicated by reference numeral 140 in the planar view of FIG. 1A.

For the purpose of the explanation which follows, the transparent areas 105 forming part of the additional colorable region 111 are grouped into two pluralities of transparent areas: 121 and 122, as illustrated in FIGS. 1A-1K.

According to the embodiment illustrated in FIGS. 1A-1K, the additional colorable region 112 forming part of barcode II appears to the left of the transparent area 117. The transparent area 117 and the transparent areas 105 which form part of the additional colorable region 112 are positioned at locations of bars which appear when barcode II is in its readable state, which is indicated by reference numeral 163 in the planar view of FIG. 1E.

For the purpose of the explanation which follows, the transparent areas 105 forming part of the additional colorable region 112 are grouped into two pluralities of transparent areas: 124 and 125, as illustrated in FIGS. 1A-1K.

According to the embodiment illustrated in FIGS. 1A-1K, the additional colorable region 114, forming part of barcode II, appears to the right of the transparent area 118. The transparent area 118 and the transparent areas 105 which form part of the additional colorable region 114 are preferably positioned in the spaces between barcode bars forming part of barcode II in its readable state, which is indicated by reference numeral 163 in the planar view of FIG. 1E.

According to the embodiment illustrated in FIGS. 1A-1K, the additional colorable region 115 forming part of barcode III appears to the left of the transparent area 119. The transparent area 119 and the transparent areas 105 which form part of the additional colorable region 115 are positioned at locations of bars which appear when barcode III is in its readable state, which is indicated by reference numeral 175 in the planar view of FIG. 1J.

Disposed behind the barcode defining layer 102 and preferably adhered thereto is a colorable element 130, such as Whatman No. 3 filter paper commercially available from Whatman International [CAT#: 1003917], which until colored is normally white. The colorable element 130 preferably extends behind the common colorable regions 110 and 113 and the additional colorable regions 111, 112, 114 and 115.

Disposed behind the barcode defining layer 102 and behind the colorable element 130 is a back layer 135. Preferably adhered to the back layer 135 rearwardly of the colorable element 130 is a temperature responsive coloring element 136, such as a pad, for example, blotting paper GB003 0.8 mm thick, commercially available from Whatman international (cat#426890), impregnated with a coloring agent, such as Sudan Black, a black color dye [CAS: 4197-25-5], dissolved to a concentration of 0.3% in 80% Oleic Acid [CAS: 112-80-1] and 20% Laurie Alcohol [CAS: 112-53-8], which freezes at 5 degrees Celsius and melts at 7 degrees Celsius.

Turning now to FIG. 1A, as can be seen in the planar view, barcode I is initially in a readable state indicated by reference numeral 140, which is typically readable by a barcode reader as 7290003804115 and barcodes II and III are in unreadable states indicated by reference numerals 141 and 142, respectively.

As can be seen in the exploded view of FIG. 1A, the transparent area 117 and the transparent areas 105 forming part of the additional colorable region 112 forming part of barcode II are initially uncolored. As a result, as can be seen in the planar view, a plurality of bars which appear when barcode II in its readable state are missing from barcode II. The missing plurality of barcode bars results in barcode II in the initial unreadable state 141 having a low BCR level.

As can also be seen in the exploded view of FIG. 1A, the transparent area 119 and the additional colorable region 115 forming part of barcode III are initially uncolored. As a result, as can be seen in the planar view, a plurality of bars which appear when barcode III in its readable state are missing from barcode III. The missing plurality of barcode bars results in barcode III in the initial unreadable state 142 having a low BCR level.

It is appreciated that if the indicator is read by a barcode reader scanning along a line which extends across more than one barcode, for example along the line designated by reference numeral 144 which extends across barcodes I and II or along the line designated by reference numeral 145 which extends across barcodes II and III, a portion of at least one of the interposed lines 106 and 107, for example a portion of the interposed line 106 designated by reference numeral 146 or a portion of the interposed line 107 designated by reference numeral 147, is detected by the barcode reader and prevents the reading of parts of multiple barcodes, in the illustrated example parts of barcodes I and II or parts of barcodes II and III, as parts of a single barcode.

Turning to FIG. 1B, as can be seen in the exploded view, when the temperature at the quality indicator exceeds 7 degrees Celsius, such as when the temperature reaches 8 degrees Celsius, the coloring agent, indicated by reference number 150 begins to melt and be released from the coloring element 136 and begins to diffuse through the colorable element 130. The colored portions of the colorable element 130 cannot be seen through the plurality of the transparent areas 105 and, as can be seen in the planar view, barcodes I, II and III remain unchanged.

Turning to FIG. 1C, as can be seen in the exploded view, following the elapse of a certain amount of time at 8 degrees, for example 30 minutes, the coloring agent 150 continues to diffuse through the colorable element 130. As a result, portions of the colorable element 130 are visible through the plurality of transparent areas indicated by reference number 124, resulting in the appearance of a plurality of bars indicated by reference numeral 152 forming part of barcode II, as can be seen in the planar view. Barcode I remains in the readable state 140, barcode III remains in the unreadable state 142, and the changed unreadable state of barcode II is indicated by reference number 153.

The barcode bars which appear at the locations of the transparent area 117 and of the plurality of transparent areas 125 when barcode II in its readable state, indicated by reference numeral 163 in FIG. 1E, are still missing from barcode II. This missing plurality of barcode bars results in the BCR level of barcode II in the unreadable state 153 being still low.

As can be seen from the planar view of FIGS. 1B and 1C, less barcode bars are missing when barcode II is in the unreadable state 153 than when it is in the unreadable state 141. Accordingly, it is appreciated that the BCR level of barcode II in the unreadable state 153 is higher than the BCR level thereof in the unreadable state 141.

Turning to FIG. 1D, as can be seen in the exploded view, following the elapse of an additional amount of time at 8 degrees, for example another 25 minutes, the coloring agent 150 continues to diffuse through the colorable element 130. As a result, portions of the colorable element 130 are visible through the plurality of transparent areas indicated by reference number 125, resulting in the appearance of an additional plurality of bars 154 forming part of barcode II, as can be seen in the planar view. Barcode I remains in the readable state 140, barcode III remains in the unreadable state 142 and the changed unreadable state of barcode II is indicated by reference number 155. Only a single narrow barcode bar which appears at the location of the transparent area 117 when barcode II in its readable state, indicated by reference numeral 163 in FIG. 1E, is still missing from barcode II, and the missing barcode bar renders barcode II in state 155 unreadable.

It is appreciated that because only a single narrow barcode bar is missing in the unreadable state 155, the BCR level of barcode II in the unreadable state 155 is higher than that of barcode II in the unreadable states 141 and 153 described in FIGS. 1A-1C.

Turning to FIG. 1E, as can be seen in the exploded view, when a threshold is exceeded by the temperature at the indicator being at least 7 degrees Celsius for at least a predetermined cumulative amount of time, such as 8 degrees Celsius for a total of at least one hour, the coloring agent 150 diffuses through the colorable element 130, such that portions of the colorable element 130 are visible through the common colorable region 110, including the transparent areas indicated by reference numerals 116 and 117.

As a result of portions of the colorable element 130 being visible through the transparent area indicated by reference numeral 116, a space indicated by reference numeral 160, which is located between bars of barcode I in its readable state, is filled in, thereby causing barcode I to assume an unreadable state 161, as can be seen in the planar view.

As a result of portions of the colorable element 130 being visible through the transparent area indicated by reference numeral 117, a single narrow barcode bar indicated by reference numeral 162 appears in barcode II, thereby causing barcode II to assume a readable state 163, as can be seen in the planar view, which is typically readable by a barcode reader as 7290003804139.

It is appreciated that because a space preferably having a width of a single narrow barcode bar located between the bars of barcode I in its readable state is filled in, the BCR level of barcode I in the unreadable state 161 is high, similar to the BCR level of barcode II in the unreadable state 155 described in FIG. 1D.

Turning to FIG. 1F, as can be seen in the exploded view, if the temperature is at least 7 degrees Celsius for an additional amount of time, for example 8 degrees Celsius for an additional 30 minutes, the coloring agent 150 continues to diffuse through the colorable element 130, such that portions of the colorable element 130 are visible through the transparent areas indicated by reference numeral 121. As a result, a plurality of spaces indicated by reference numeral 165 located between the bars of barcode I in its readable state is filled in, as can be seen in the planar view. Barcode II remains in the readable state 163, barcode III remains in the unreadable state 142 and barcode I assumes a further unreadable state, indicated by reference number 166. As a result of the coloring of the plurality of spaces 165, the BCR level of barcode I in the unreadable state 166 decreases.

As can be seen from the planar view of FIGS. 1E and 1F, more spaces are filled in between bars of barcode I in the unreadable state 166 than in the unreadable state 161. Accordingly, it is appreciated that the BCR level of barcode I is lower in the unreadable state 166 than in the unreadable state 161.

Turning to FIG. 1G, as can be seen in the exploded view, if the temperature is at least 7 degrees Celsius for an additional amount of time, for example 8 degrees Celsius for an additional 30 minutes, the coloring agent 150 continues to diffuse through the colorable element 130, such that portions of the colorable element 130 are visible through the transparent areas indicated by reference numeral 122. As a result, an additional plurality of spaces indicated by reference numeral 167, located between the bars of barcode I in its readable state, appears colored, as can be seen in the planar view. Barcode II remains in the readable state 163, barcode III remains in the unreadable state 142 and barcode I assumes a further unreadable state 168. As a result of the coloring of the additional plurality of spaces 167, the BCR level of barcode I in the unreadable state 168 further decreases.

As can be seen from the planar view of FIGS. 1F and 1G, more spaces are filled in between barcode bars of barcode I in the unreadable state 168 than in the unreadable state 166. Accordingly, the BCR level of barcode I is lower in the unreadable state 168 than in the unreadable state 166.

Figure 1H:
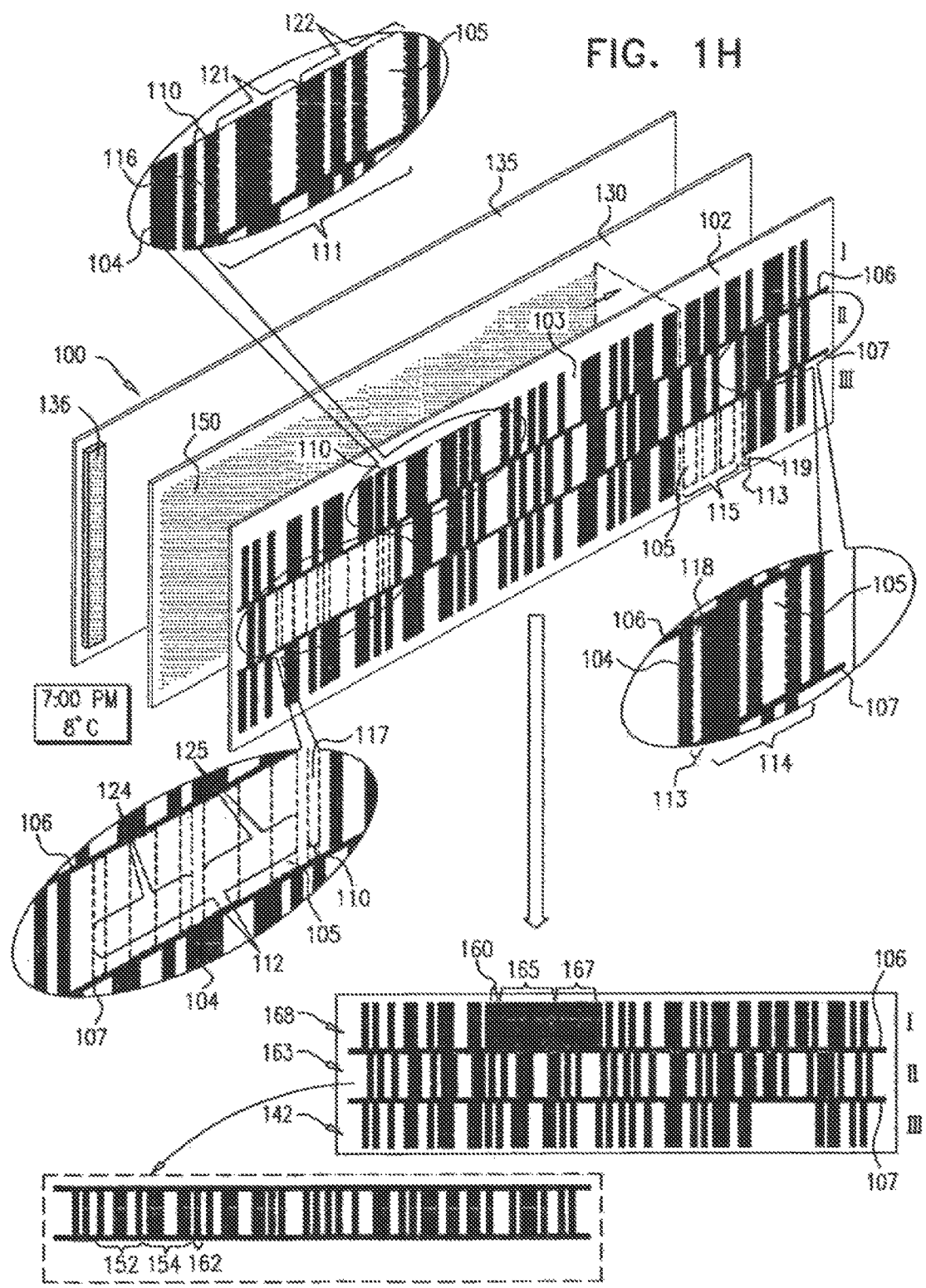

Turning to FIG. 1H, as can be seen in the exploded view, if the temperature is at least 7 degrees Celsius for an additional amount of time, for example 8 degrees Celsius for an additional one hour, the coloring agent 150 continues to diffuse through the colorable element 130. The additional colored portions of the colorable element 130 are not seen through the plurality of the transparent areas 105 and, as can be seen in the planar view, barcodes I, II and III remain unchanged.

As can be seen in the exploded view of FIG. 1H, the transparent area 119 and the additional colorable region 115 forming part of barcode III are still uncolored. As a result, as can be seen in the planar view, a plurality of bars which appear when barcode III in its readable state, indicated by reference numeral 175 in FIG. 1J, are still missing from barcode III. The missing barcode bars result in barcode III in the unreadable state 142 having a low BCR level.

Figure 1I:
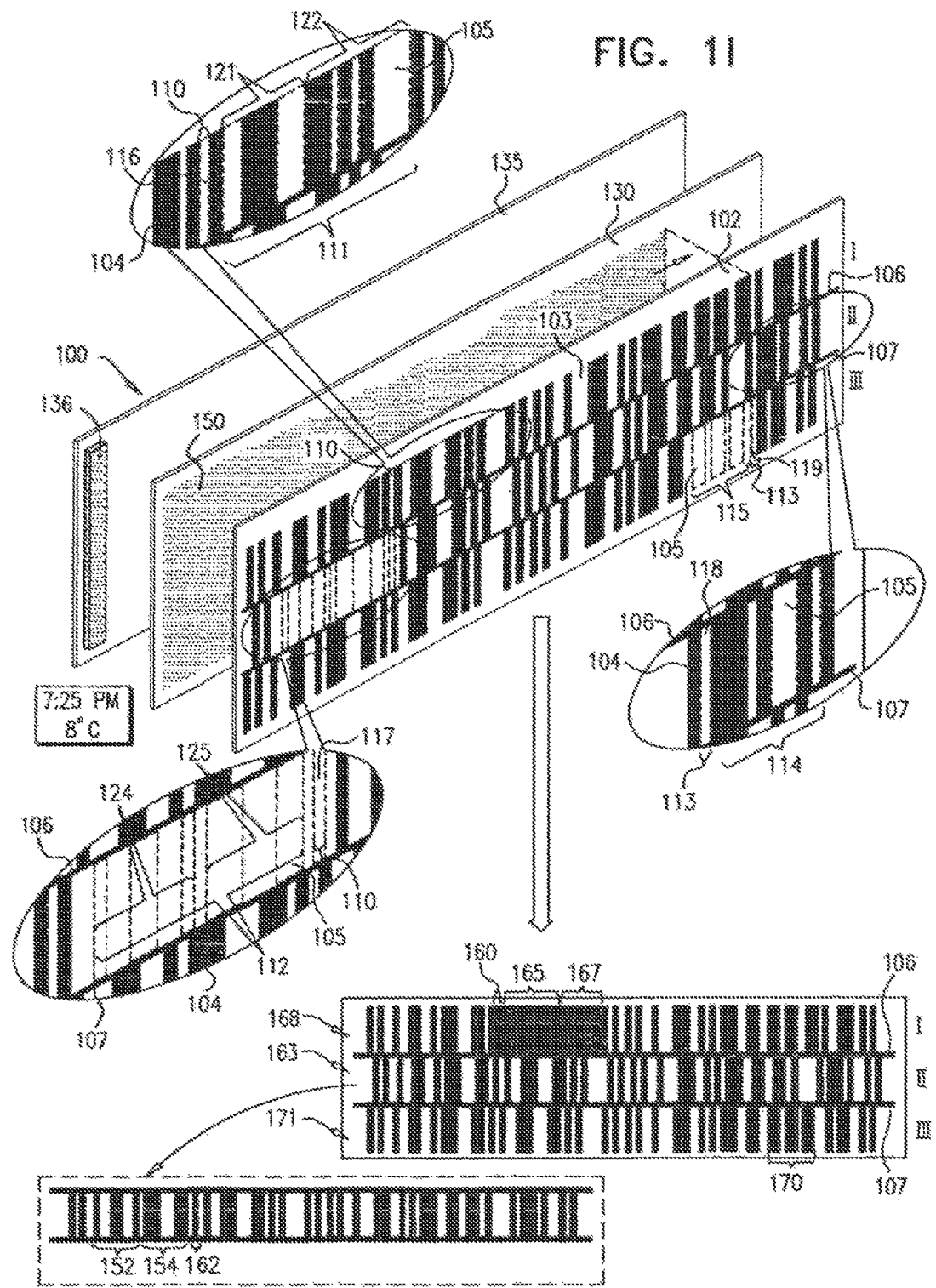

Turning to FIG. 1I, as can be seen in the exploded view, following the elapse of an additional amount of time at 8 degrees, for example another 8 minutes, the coloring agent 150 continues to diffuse through the colorable element 130. As a result, portions of the colorable element 130 are visible through the plurality of transparent areas 105 forming part of the additional colorable region indicated by reference numeral 115, resulting in the appearance of a plurality of bars 170 forming part of barcode III, as can be seen in the planar view. Barcode I remains in the unreadable state 168, barcode II remains in the readable state 163 and the changed unreadable state of barcode III is indicated by reference number 171. Only a portion of a barcode bar which appears at the location of the transparent area 119 when barcode III in its readable state, the portion having a width of a single narrow barcode bar, is still missing from barcode III, and the missing barcode bar portion renders barcode III in state 171 unreadable.

It is appreciated that because only a portion of a barcode bar is missing in the unreadable state 171, the portion having a width of a single narrow barcode bar, the BCR level of barcode III in the unreadable state 171 is higher than that of barcode III in the unreadable state 142 described in FIGS. 1A-1H.

Turning to FIG. 1J, as can be seen in the exploded view, when a second threshold is exceeded by the temperature at the indicator being at least 7 degrees Celsius for at least a second predetermined cumulative amount of time, such as 8 degrees Celsius for a total of at least three and a half hours, the coloring agent 150 diffuses through the colorable element 130, such that portions of the colorable element 130 are visible through the common colorable region 113, including the transparent areas indicated by reference numerals 118 and 119.

As a result of portions of the colorable element 130 being visible through the transparent area indicated by reference numeral 118, a space indicated by reference numeral 172, which is located between bars of barcode II in its readable state, is filled in, thereby causing barcode II to assume an unreadable state 173, as can be seen in the planar view.

As a result of portions of the colorable element 130 being visible through the transparent area indicated by reference numeral 119, a portion of a barcode appears in barcode III, the portion being indicated by reference numeral 174 and having a width of a single narrow barcode bar. As a result, barcode III assumes a readable state 175, as can be seen in the planar view, which is typically readable by a barcode reader as 7290003804122.

It is appreciated that because a space preferably having a width of a single narrow barcode bar located between the bars of barcode II in its readable state is filled in, the BCR level of barcode II in the unreadable state 173 is high, similar to the BCR level of barcode III in the unreadable state 171 described in FIG. 1I.

Figure 1K:
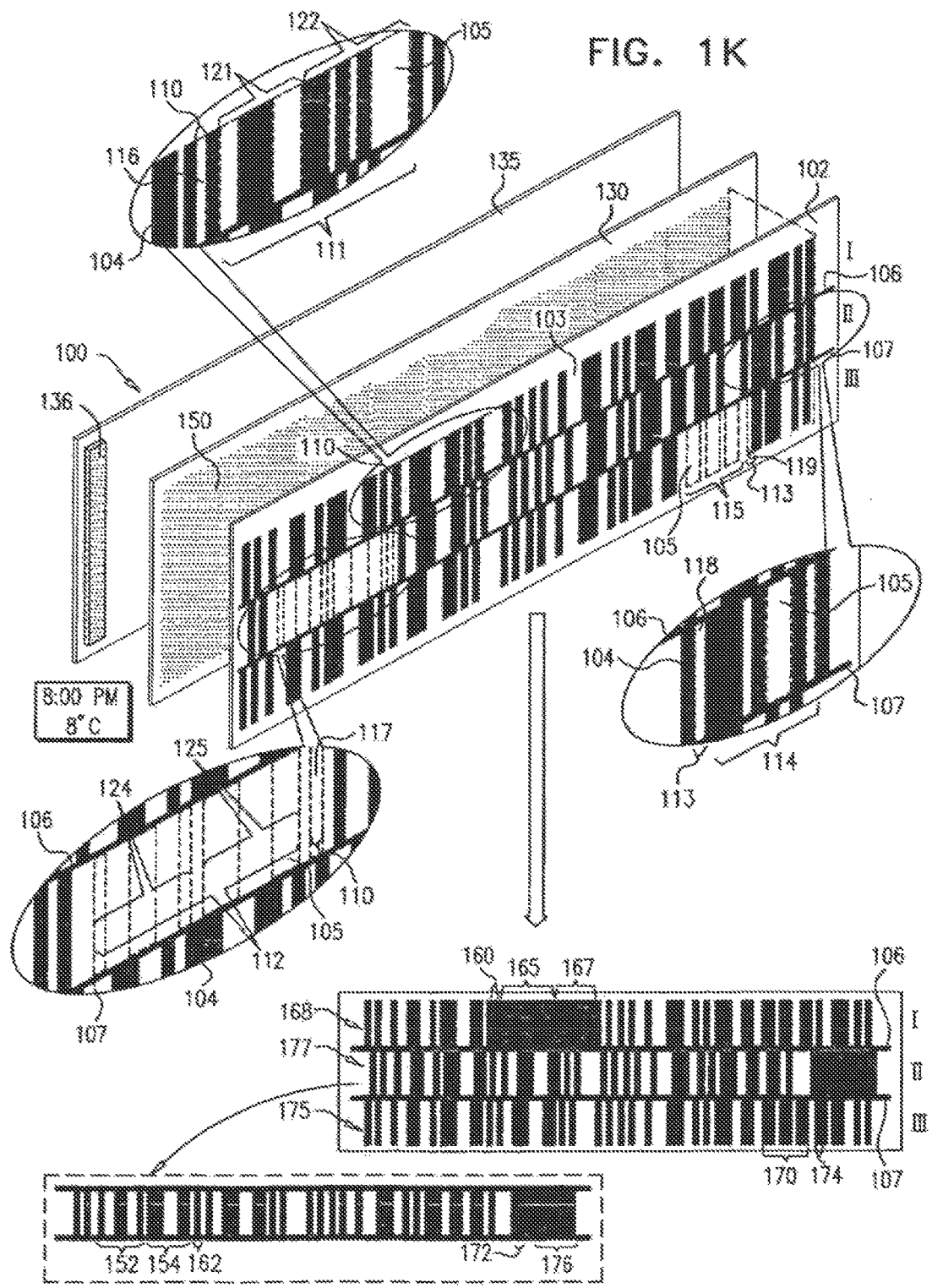
Figure 21:
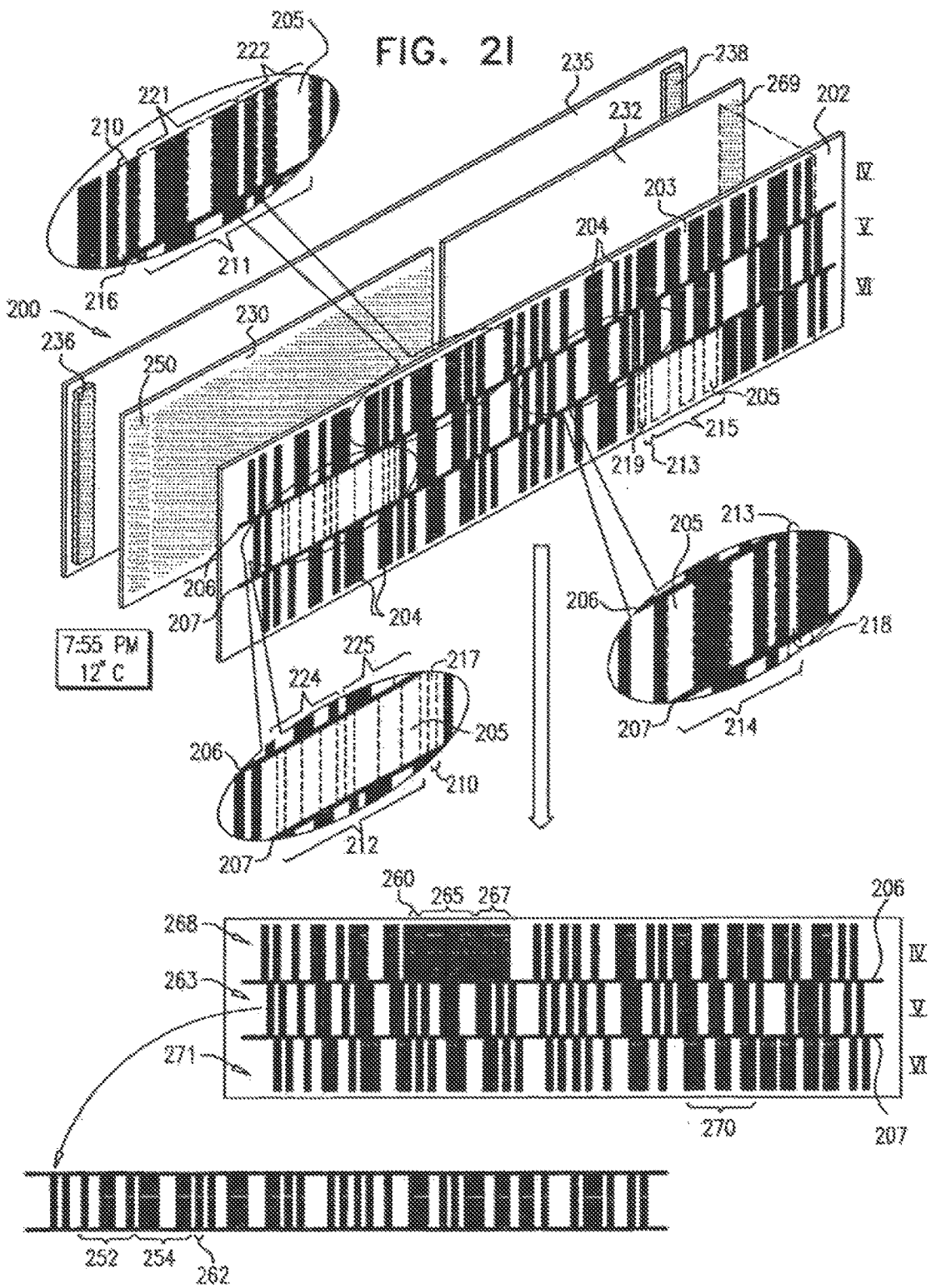

Turning to FIG. 1K, as can be seen in the exploded view, if the temperature is at least 7 degrees Celsius for an additional amount of time, for example 8 degrees Celsius for an additional 30 minutes, the coloring agent 150 continues to diffuse through the colorable element 130, such that portions of the colorable element 130 are visible through the transparent areas 105 forming part of the additional colorable region indicated by reference number 114. As a result, a plurality of spaces 176, located between the bars of barcode II in its readable state, is filled in, as can be seen in the planar view. Barcode I remains in the unreadable state 168, barcode III remains in the readable state 175 and barcode II assumes a further unreadable state, indicated by reference numeral 177. The plurality of spaces 176 becoming filled in causes the BCR level of barcode II in the unreadable state 177 to decrease.

As can be seen from the planar view of FIGS. 1J and 1K, more spaces are filled in between barcode bars of barcode II in the unreadable state 177 than in the unreadable state 173. Accordingly, it is appreciated that the BCR level of barcode II is lower in the unreadable state 177 than in the unreadable state 173.

It is appreciated that if the temperature drops below 7 degrees Celsius the coloring agent 150 continues to diffuse through the colorable element 130. If, after the temperature reaches 7 degrees Celsius, the temperature drops below 5 degrees Celsius, then the coloring agent 150 becomes solid and diffusion thereof through the colorable element 130 is suspended until the temperature again reaches 7 degrees Celsius.

Reference is now made to FIGS. 2A-2K, which together are a simplified illustration of the construction and operation of one embodiment of a quality indicator for indicating a combination of elapsed time and temperature. The quality indicator described in FIGS. 2A-2K is operative to provide separate indications of exceedance of two different temperatures: 7 degrees Celsius and 10 degrees Celsius, for a time duration of at least one hour at each temperature.

In each of FIGS. 2A-2K, the quality indicator 200 appears both in an exploded view in the middle of the drawing and in a planar view at the bottom portion of the drawing.

As seen in the exploded view in FIGS. 2A-2K, the quality indicator, here indicated by reference number 200, preferably includes a barcode defining layer 202, which is preferably printed on a transparent substrate. The printing on the transparent substrate preferably defines a background area 203, which is preferably printed with black ink and overprinted with white ink, a plurality of bars 204 forming part of barcodes IV, V and VI which are preferably printed with black ink, and a plurality of transparent areas 205, which are preferably printed with light blue ink, such as Pantone No. 645, which has a visual appearance similar to that of the black ink overprinted with white ink. Alternatively, the background area 203 and the plurality of bars 204 are printed in such colors so as to define high contrast therebetween.

The barcodes IV, V and VI are preferably arranged in a stacked arrangement. The barcodes IV and V are preferably separated by an interposed line 206, which is preferably printed on the transparent substrate. The interposed line 206 is preferably generally parallel to the axes of the barcodes. The barcodes V and VI are preferably separated by an interposed line 207, which is preferably printed on the transparent substrate. The interposed line 207 is preferably generally parallel to the axes of the barcodes.

The interposed lines 206 and 207 are preferably printed in black ink and extend in the illustrated embodiment throughout the length of the barcodes. Alternatively, the interposed lines 206 and 207 extend as necessary to prevent a barcode reader from reading parts of barcodes IV, V and VI as a single barcode.

It is appreciated that barcodes IV, V and VI need not be positioned on the indicator in any particular order.

The transparent areas 205 preferably form part of six regions: a common colorable region 210 forming part of barcodes IV and V, an additional colorable region 211 forming part of barcode IV, an additional colorable region 212 forming part of barcode V, a common colorable region 213 forming part of barcode s V and VI, an additional colorable region 214 forming part of barcode V and an additional colorable region 215 forming part of barcode VI.

Preferably, the common colorable region 210 includes two transparent areas, transparent area 216 forming part of barcode IV and transparent area 217 forming part of barcode V.

Preferably, the common colorable region 213 includes two transparent areas, transparent area 218 forming part of barcode V and transparent area 219 forming part of barcode VI.

According to the embodiment illustrated in FIGS. 2A-2K, the additional colorable region 211, forming part of barcode IV, appears to the right of the transparent area 216. The transparent area 216 and the transparent areas 205 which form part of the additional colorable region 211 are preferably positioned in the spaces between barcode bars forming part of barcode IV in its readable state, which is indicated by reference numeral 240 in the planar view of FIG. 2A.

For the purpose of the explanation which follows, the transparent areas 205 forming part of the additional colorable region 211 are grouped into two pluralities of transparent areas: 221 and 222, as illustrated in FIGS. 2A-2K.

According to the embodiment illustrated in FIGS. 2A-2K, the additional colorable region 212 forming part of barcode V appears to the left of the transparent area 217. The transparent area 217 and the transparent areas 205 which form part of the additional colorable region 212 are positioned at locations of bars which appear when barcode V is in its readable state, which is indicated by reference numeral 263 in the planar view of FIG. 2E.

For the purpose of the explanation which follows, the transparent areas 205 forming part of the additional colorable region 212 are grouped into two pluralities of transparent areas: 224 and 225, as illustrated in FIGS. 2A-2K.

According to the embodiment illustrated in FIGS. 2A-2K, the additional colorable region 214, forming part of barcode V, appears to the left of the transparent area 218. The transparent area 218 and the transparent areas 205 which form part of the additional colorable region 214 are preferably positioned in the spaces between barcode bars forming part of barcode V in its readable state, which is indicated by reference numeral 263 in the planar view of FIG. 2E.

According to the embodiment illustrated in FIGS. 2A-2K, the additional colorable region 215 forming part of barcode VI appears to the right of the transparent area 219. The transparent area 219 and the transparent areas 205 which form part of the additional colorable region 215 are positioned at locations of bars which appear when barcode VI is in its readable state, which is indicated by reference numeral 275 in the planar view of FIG. 2J.

Disposed behind the barcode defining layer 202 and preferably adhered thereto is a colorable element 230, such as Whatman No. 3 filter paper commercially available from Whatman International [CAT#: 1003917], which until colored is normally white. The colorable element 230 preferably extends behind the common colorable region 210 and the additional colorable regions 211 and 212.

Also disposed behind the barcode defining layer 202 and preferably adhered thereto is an additional colorable element 232, such as Whatman No. 3 filter paper commercially available from Whatman International [CAT#: 1003917], which until colored is normally white. The colorable element 232 is preferably adjacent the colorable element 230 and preferably extends behind the common colorable region 213 and the additional colorable regions 214 and 215.

It is appreciated that instead of including two separate colorable elements, an indicator according to the present invention can include a single colorable element separated into two portions by a separator made of a material which is impermeable to ink, such as varnish.

Disposed behind the barcode defining layer 202 and behind the colorable elements 230 and 232 is a back layer 235.

Preferably adhered to the back layer 235 rearwardly of the colorable element 230 is a temperature responsive coloring element 236, such as a pad, for example, blotting paper GB003 0.8 mm thick, commercially available from Whatman international (cat#426890), impregnated with a coloring agent, such as Sudan Black, a black color dye [CAS: 4197-25-5], dissolved to a concentration of 0.3% in 80% Oleic Acid [CAS: 112-80-1] and 20% Laurie Alcohol [CAS: 112-53-8], which freezes at 5 degrees Celsius and melts at 7 degrees Celsius.

Preferably also adhered to the back layer 235 rearwardly of the colorable element 232 is a temperature responsive coloring element 238, such as a pad, for example, blotting paper GB003 0.8 mm thick, commercially available from Whatman international (cat#426890), impregnated with a coloring agent, such as Sudan Black, a black color dye [CAS: 4197-25-5], dissolved to a concentration of 0.3% in 100% Decyl Decanoate [CAS: 1654-86-0], which freezes at 9 degrees Celsius and melts at 10 degrees Celsius.

Turning now to FIG. 2A, as can be seen in the planar view, barcode IV is initially in a readable state indicated by reference numeral 240, which is typically readable by a barcode reader as 7290003804115 and barcodes V and VI are in unreadable states indicated by reference numerals 241 and 242, respectively.

As can be seen in the exploded view of FIG. 2A, the transparent area 217 and the transparent areas 205 forming part of the additional colorable region 212 forming part of barcode V are initially uncolored. As a result, as can be seen in the planar view, a plurality of bars which appear when barcode V in its readable state are missing from barcode V. The missing plurality of barcode bars results in barcode V in the initial unreadable state 241 having a low BCR level.

As can also be seen in the exploded view of FIG. 2A, the transparent area 219 and the additional colorable region 215 forming part of barcode VI are initially uncolored. As a result, as can be seen in the planar view, a plurality of bars which appear when barcode VI in its readable state are missing from barcode VI. The missing plurality of barcode bars results in barcode VI in the initial unreadable state 242 having a low BCR level.

It is appreciated that if the indicator is read by a barcode reader scanning along a line which extends across more than one barcode, for example along the line designated by reference numeral 244 which extends across barcodes IV and V or along the line designated by reference numeral 245 which extends across barcodes V and VI, a portion of at least one of the interposed lines 206 and 207, for example a portion of the interposed line 206 designated by reference numeral 246 or a portion of the interposed line 207 designated by reference numeral 247, is detected by the barcode reader and prevents the reading of parts of multiple barcodes, in the illustrated example parts of barcodes IV and V or parts of barcodes V and VI, as parts of a single barcode.

Turning to FIG. 2B, as can be seen in the exploded view, when the temperature at the quality indicator exceeds 7 degrees Celsius, such as when the temperature reaches 8 degrees Celsius, the coloring agent, indicated by reference numeral 250 begins to melt and be released from the coloring element 236 and begins to diffuse through the colorable element 230. The colored portions of the colorable element 230 cannot be seen through the plurality of the transparent areas 205 and, as can be seen in the planar view, barcodes FV, V and VI remain unchanged.

Turning to FIG. 2C, as can be seen in the exploded view, following the elapse of a certain amount of time at 8 degrees, for example 30 minutes, the coloring agent 250 continues to diffuse through the colorable element 230. As a result, portions of the colorable element 230 are visible through the plurality of transparent areas indicated by reference numeral 224, resulting in the appearance of a plurality of bars indicated by reference numeral 252 forming part of barcode V, as can be seen in the planar view. Barcode IV remains in the readable state 240, barcode VI remains in the unreadable state 242, and the changed unreadable state of barcode V is indicated by reference number 253.

The barcode bars which appear at the locations of the transparent area 217 and of the plurality of transparent areas 225 when barcode V in its readable state, indicated by reference numeral 263 in FIG. 2E, are still missing from barcode V. This missing plurality of barcode bars results in the BCR level of barcode V in the unreadable state 253 being still low.

As can be seen from the planar view of FIGS. 2B and 2C, less barcode bars are missing when barcode V is in the unreadable state 253 than when it is in the unreadable state 241. Accordingly, it is appreciated that the BCR level of barcode V in the unreadable state 253 is higher than the BCR level thereof in the unreadable state 241.

Turning to FIG. 2D, as can be seen in the exploded view, following the elapse of an additional amount of time at 8 degrees, for example another 25 minutes, the coloring agent 250 continues to diffuse through the colorable element 230. As a result, portions of the colorable element 230 are visible through the plurality of transparent areas indicated by reference numeral 225, resulting in the appearance of an additional plurality of bars 254 forming part of barcode V, as can be seen in the planar view. Barcode IV remains in the readable state 240, barcode VI remains in the unreadable state 242 and the changed unreadable state of barcode V is indicated by reference number 255. Only a single narrow barcode bar which appears at the location of the transparent area 217 when barcode V in its readable state, indicated by reference numeral 263 in FIG. 2E, is still missing from barcode V, and the missing barcode bar renders barcode V in state 255 unreadable.

It is appreciated that because only a single barcode bar is missing in the unreadable state 255, the BCR level of barcode V in the unreadable state 255 is higher than that of barcode V in the unreadable states 241 and 253 described in FIGS. 2A-2C.

Turning to FIG. 2E, as can be seen in the exploded view, when a threshold is exceeded by the temperature at the indicator being at least 7 degrees Celsius for at least a predetermined cumulative amount of time, such as 8 degrees Celsius for a total of at least one hour, the coloring agent 250 diffuses through the colorable element 230, such that portions of the colorable element 230 are visible through the common colorable region 210, including the transparent areas indicated by reference numerals 216 and 217.

As a result of portions of the colorable element 230 being visible through the transparent area indicated by reference numeral 216, a space indicated by reference numeral 260, which is located between bars of barcode IV in its readable state, is filled in, thereby causing barcode IV to assume an unreadable state 261, as can be seen in the planar view.

As a result of portions of the colorable element 230 being visible through the transparent area indicated by reference numeral 217, a single barcode bar indicated by reference numeral 262 appears in barcode V, thereby causing barcode V to assume a readable state 263, as can be seen in the planar view, which is typically readable by a barcode reader as 7290003804139.

It is appreciated that because a space preferably having a width of a single narrow barcode bar located between the bars of barcode FV in its readable state is filled in, the BCR level of barcode IV in the unreadable state 261 is high, similar to the BCR level of barcode V in the unreadable state 255 described in FIG. 2D.

Turning to FIG. 2F, as can be seen in the exploded view, if the temperature is at least 7 degrees Celsius for an additional amount of time, for example 8 degrees Celsius for an additional 30 minutes, the coloring agent 250 continues to diffuse through the colorable element 230, such that portions of the colorable element 230 are visible through the transparent areas indicated by reference numeral 221.

As a result, a plurality of spaces indicated by reference numeral 265 located between the bars of barcode IV in its readable state are filled in, as can be seen in the planar view. Barcode V remains in the readable state 263, barcode VI remains in the unreadable state 242 and barcode FV assumes a further unreadable state, indicated by reference number 266. As a result of the plurality of spaces 265 becoming filled in, the BCR level of barcode IV in the unreadable state 266 decreases As can be seen from the planar view of FIGS. 2E and 2F, more spaces are filled in between barcode bars of barcode IV in the unreadable state 266 than in the unreadable state 261. Accordingly, it is appreciated that the BCR level of barcode FV is lower in the unreadable state 266 than in the unreadable state 261.

Turning to FIG. 2G, as can be seen in the exploded view, if the temperature is at least 7 degrees Celsius for an additional amount of time, for example 8 degrees Celsius for an additional 30 minutes, the coloring agent 250 continues to diffuse through the colorable element 230, such that portions of the colorable element 230 are visible through the transparent areas indicated by reference number 222. As a result, an additional plurality of spaces indicated by reference numeral 267, located between the bars of barcode IV in its readable state, are filled in, as can be seen in the planar view. Barcode V remains in the readable state 263, barcode VI remains in the unreadable state 242 and barcode IV assumes a further unreadable state 268. As a result of the additional plurality of spaces 267 becoming filled in, the BCR level of barcode IV in the unreadable state 268 further decreases.

As can be seen from the planar view of FIGS. 2F and 2G, more spaces are filled in between barcode bars of barcode IV in the unreadable state 268 than in the unreadable state 266.

Accordingly, the BCR level of barcode IV is lower in the unreadable state 268 than in the unreadable state 266.

It is appreciated that if the temperature drops below 7 degrees Celsius, the coloring agent 250 continues to diffuse through the colorable element 230. If, at any time after the temperature reaches 7 degrees Celsius, the temperature drops below 5 degrees Celsius, then the coloring agent 250 becomes solid and diffusion thereof through the colorable element 230 is suspended until the temperature again reaches 7 degrees Celsius.

Turning to FIG. 2H, as can be seen in the exploded view, when the temperature at the quality indicator exceeds 10 degrees Celsius, such as when the temperature reaches 12 degrees Celsius, the coloring agent, indicated by reference number 269 begins to melt and be released from the coloring element 238 and begins to diffuse through the colorable element 232. The colored portions of the colorable element 232 cannot be seen through the plurality of the transparent areas 205 and, as can be seen in the planar view, barcodes IV, V and VI remain unchanged.

As can be seen in the exploded view of FIG. 2H, the transparent area 219 and the additional colorable region 215 forming part of barcode VI are still uncolored. As a result, as can be seen in the planar view, a plurality of bars which appear when barcode VI in its readable state, indicated by reference numeral 275 in FIG. 2J, are still missing from barcode VI. The missing barcode bars result in barcode VI in the unreadable state 242 having a low BCR level.

It is appreciated that if the temperature increases above a second predetermined temperature before exceedance of a first threshold, which includes a first predetermined time duration at a first predetermined temperature, the coloring agent responsive to the second predetermined temperature melts and starts to be released from the corresponding coloring element before coloring of the common colorable region which is operative to indicate the exceedance of the first threshold. For example, in the embodiment illustrated in FIGS. 2A-2K, if the temperature exceeds 10 degrees Celsius before the exceedance of one hour at a temperature of at least 7 degrees Celsius, the coloring agent 269 melts and starts to be released from the coloring element 238, before the common colorable region 210 is colored by the coloring agent 250.

Turning to FIG. 2I, as can be seen in the exploded view, following the elapse of a certain amount of time at 12 degrees, for example 55 minutes, the coloring agent 269 continues to diffuse through the colorable element 232. As a result, portions of the colorable element 232 are visible through the plurality of transparent areas 205 forming part of the additional colorable region indicated by reference number 215, resulting in the appearance of a plurality of bars 270 forming part of barcode VI, as can be seen in the planar view. Barcode IV remains in the unreadable state 268, barcode V remains in the readable state 263 and the changed unreadable state of barcode VI is indicated by reference number 271. Only a single narrow barcode bar, which appears at the location of the transparent area 219 when barcode VI in its readable state, is still missing from barcode VI, and the missing barcode bar renders barcode VI in state 271 unreadable.

It is appreciated that because only a single narrow barcode bar is missing in the unreadable state 271, the BCR level of barcode VI in the unreadable state 271 is higher than that of barcode VI in the unreadable state 242 described in FIGS. 2A-2H.

Turning to FIG. 2J, as can be seen in the exploded view, when a second threshold is exceeded by the temperature at the indicator being at least 10 degrees Celsius for at least a predetermined cumulative amount of time, such as 12 degrees Celsius for a total of at least one hour, the coloring agent 269 diffuses through the colorable element 232, such that portions of the colorable element 232 are visible through the common colorable region 213, including the transparent areas indicated by reference numerals 218 and 219.

As a result of portions of the colorable element 232 being visible through the transparent area indicated by reference numeral 218, a space indicated by reference numeral 272, which is located between bars of barcode V in its readable state, is filled in thereby causing barcode V to assume an unreadable state 273, as can be seen in the planar view.

As a result of portions of the colorable element 232 being visible through the transparent area indicated by reference numeral 219, a single narrow barcode bar indicated by reference numeral 274 appears in barcode VI, thereby causing barcode VI to assume a readable state 275, as can be seen in the planar view, which is typically readable by a barcode reader as 7290003804122.

It is appreciated that because a space preferably having a width of a single narrow barcode bar located between the bars of barcode V in its readable state is filled in, the BCR level of barcode V in the unreadable state 273 is high, similar to the BCR level of barcode VI in the unreadable state 271 described in FIG. 2l.

It is appreciated that since the distance between the common colorable region 213 and the coloring element 238 is at least equal to the distance between the common colorable region 210 and the coloring element 236, the common colorable region 213 will not become colored prior to the coloring of the common colorable region 210. Alternatively, the colorable elements 230 and 232 are made from different materials such that diffusion along the colorable element 232 is slower than diffusion along the colorable element 230.

According to an embodiment of the present invention, the indicator of the present invention can be useful to indicate the exceedance of thresholds that are not always exceeded in the same order. For example, the indicator can be used to indicate the exceedance of a first threshold and a second threshold, wherein the first threshold includes a temperature lower than the temperature of the second threshold but a time duration longer than the time duration of the second threshold.

According to this embodiment, in the indicator presented in FIGS. 2A-2K, an additional colorable area is added in barcode IV such that both barcodes FV and V become unreadable in response to exceedance of the threshold which is more likely to be indicated second, for example the second threshold described above, which includes the higher temperature.

In accordance with this embodiment, if the first threshold is exceeded before exceedance of the second threshold, exceedance of the first threshold is indicated by barcode IV becoming unreadable and by barcode V becoming readable. Exceedance of the second threshold is indicated by barcode V becoming unreadable and by barcode VI becoming readable. Barcode IV, which becomes unreadable following the exceedance of the first threshold, is still unreadable regardless of the additional colorable region.

However, if the first threshold is exceeded following exceedance of the second threshold, exceedance of the first threshold is not indicated because following exceedance of the second threshold both barcodes IV and V become unreadable.

In accordance with another embodiment of the present invention, the colorable element is not separated into two portions, and indication of exceedance of the second threshold can also result from exceedance of a second time duration at or above the predetermined temperature of the first threshold.

Turning to FIG. 2K, as can be seen in the exploded view, if the temperature is at least 10 degrees Celsius for an additional amount of time, for example 12 degrees Celsius for an additional 30 minutes, the coloring agent 269 continues to diffuse through the colorable element 232, such that portions of the colorable element 232 are visible through the transparent areas 205 forming part of the additional colorable region indicated by reference number 214. As a result, a plurality of spaces 276, located between the bars of barcode V in its readable state, is filled in, as can be seen in the planar view. Barcode IV remains in the unreadable state 268, barcode VI remains in the readable state 275 and barcode V assumes a further unreadable state, indicated by reference numeral 277. As a result of the plurality of spaces 276 becoming filled in, the BCR level of barcode V in the unreadable state 277 decreases As can be seen from the planar view of FIGS. 2J and 2K, more spaces are filled in between barcode bars of barcode V in the unreadable state 277 than in the unreadable state 273. Accordingly, it is appreciated that the BCR level of barcode V is lower in the unreadable state 277 than in the unreadable state 273.

It is appreciated that if the temperature drops below 10 degrees Celsius the coloring agent 269 continues to diffuse through the colorable element 232. If, after the temperature reaches 10 degrees Celsius, the temperature drops below 9 degrees Celsius, then the coloring agent 269 becomes solid and diffusion thereof through the colorable element 232 is suspended until the temperature again reaches 10 degrees Celsius.

In the embodiment described in FIGS. 2A-2K, the coloring agent 269 moves along the coloring element 232 from right to left and therefore the additional colorable region 214, forming part of barcode V, appears to the left of the transparent area 218 and the additional colorable region 215, forming part of barcode VI, appears to the right of the transparent area 219. Alternatively, the coloring agent 269 moves along the coloring element 232 from left to right, and then the additional colorable region 214 appears to the right of the transparent area 218 and the additional colorable region 215 appears to the left of the transparent area 219.

The phrase "more than a single narrow barcode bar" means more than one barcode bar, the barcode bars being narrow or wide or more than a portion of a wide barcode bar, the portion being of the same width as a narrow barcode bar.

According to the embodiment illustrated in FIGS. 1A-2K, the colorable areas forming part of the additional colorable region and the common colorable region become colored sequentially. Alternatively, the colorable areas forming part of the additional colorable region and of the common colorable region become colored generally simultaneously.

The phrase "generally simultaneously", as defined in this application, means within a short time period.

It is appreciated that instead of being initially uncolored and becoming colored, a colorable area can be initially colored and become uncolored.

Preferably, as colorable areas become colored, barcode bars or portions thereof appear and spaces between barcodes or portions thereof become filled in. Alternatively, as colorable areas become colored, barcode bars or portions thereof disappear and spaces or portions thereof appear between barcode bars.

It is further appreciated that the quality indicator may be operative to provide an indication of exceedance only following actuation thereof. Alternatively, as illustrated in the description and drawings of this application, the quality indicator may be operative to provide an indication of exceedance without actuation.

According to a preferred embodiment of the present invention barcodes forming part of a quality indicator are each capable of indicating any numerical or alphanumerical sequence. Additionally or alternatively, barcodes forming part of a quality indicator are each capable of complying with any suitable barcode standard, including but not limited to EAN, UPC, 2 of 5 Interleaved, code 39, code 39 extended, code 93, code 93 extended, code 128, code 128 A, B and C, ISBN, Code bar and Data Matrix. Accordingly, different barcodes forming part of the same quality indicator can comply with different barcode standards. For example, a quality indicator can include a first barcode complying with the EAN 13 standard and a second barcode complying with the 2 of 5 Interleaved standard. Consequently, if the barcode reader of a checkout scanner is operative to read only the EAN 13 barcode standard, then, once the first barcode becomes unreadable, the indicator no longer presents a readable barcode to the checkout scanner. However, the indicator is still readable by a barcode reader operative to read the 2 of 5 Interleaved standard.

It is appreciated that an indicator according to the present invention can include more than three barcodes, wherein only one barcode is readable generally at any given time and as a result of exceedance of a threshold the readable barcode becomes unreadable and one of the unreadable barcodes becomes readable.

It is appreciated that the background of the barcode defining layer of the indicator may be printed in a dark color and the bars of the barcode may be printed in a light color.

It is appreciated that the melting of the coloring agent may be caused by a change in ambient parameters other than temperature, such as pH, humidity or the presence of certain chemicals, thereby enabling the use of the indicators described in the present invention for indicating exceedance of thresholds relating to such parameters.

It will be appreciated by persons skilled in the art that the present invention is not limited by what has been particularly shown and described hereinabove. Rather the scope of the present invention includes both combinations and sub-combinations of various features of the invention and modifications thereof which may occur to persons skilled in the art upon reading the foregoing description and which are not in the prior art.

The invention claimed is:

1. A method for providing quality management for products, the method comprising:
   employing a multiplicity of barcoded quality indicators each operative to provide a machine-readable indication of exceedance of at least one threshold by at least one product quality affecting parameter, each of said indicators comprising:
   a first barcode including a first plurality of barcode bars and at least one first colorable area,
   at least a second barcode including a second plurality of barcode bars and at least a second colorable area,
   a coloring agent located at a first location on said indicator;

a coloring agent pathway operative to allow said coloring agent to move from said first location to said first and second colorable areas for coloring thereof; and at least one interposed line extending between said first barcode and said at least a second barcode, said at least one interposed line being capable of preventing a barcode reader from reading parts of said first barcode and of said at least a second barcode as part of a single barcode; and reading said barcoded quality indicators to provide output indications;

receiving said output indications; and interpreting said output indication to provide human sensible, product quality status outputs.

2. A method according to claim 1, wherein:

said first barcode is readable before exceedance of said at least one threshold, said second barcode is unreadable before exceedance of said at least one threshold, and upon exceedance of said at least one threshold said first barcode becomes unreadable as a result of coloring of at least a portion of said at least one first colorable area and generally simultaneously said at least a second barcode becomes readable as a result of coloring of at least a portion of said at least a second colorable area.

3. A method according to claim 2, wherein:

said at least one first colorable area is initially uncolored and forms part of a first set of initially uncolored, colorable areas positioned at locations between bars of said first barcode when said first barcode is in a first barcode readable state prior to exceedance of said at least one threshold, said at least a second colorable area is initially uncolored and forms part of a second set of initially uncolored, colorable areas positioned at locations of bars of said second barcode which appear only when said second barcode is in a second barcode readable state following exceedance of said at least one threshold, said at least a second barcode is in a second barcode unreadable state prior to exceedance of said at least one threshold, and as a result of said second set being uncolored, more than a single narrow barcode bar is missing from said at least a second barcode.

4. A method according to claim 3, wherein said first set of colorable areas continues to be colored following exceedance of said at least one threshold.

5. A method according to claim 4, wherein colorable areas forming part of at least one of said first set of colorable areas and said second set of colorable areas become colored sequentially.

6. A method according to claim 1, wherein said coloring agent pathway is operative to allow said coloring agent to move by diffusing from said first location to said first and said second colorable areas.

7. A method according to claim 1, wherein said at least one threshold includes at least one time threshold.

8. A method according to claim 1, wherein said at least one threshold includes at least one time and temperature threshold.

9. A method according to claim 1, wherein said quality indicator is operative to provide indications of exceedance of several different thresholds.

10. A method according to claim 1, wherein said barcoded indicator further comprises:

at least a third barcode including a third plurality of barcode bars and at least a third colorable area, and at least one additional interposed line extending between said at least a second barcode and said at least a third barcode, said additional interposed line being capable of preventing a barcode reader from reading parts of said at least a second barcode and of said at least a third barcode as part of a single barcode.

11. A method according to claim 10, wherein:

said at least a third barcode is not readable before exceedance of said at least one additional threshold, and said at least a second barcode includes at least a fourth colorable area, and upon exceedance of said at least one additional threshold said at least a second barcode becomes unreadable as a result of coloring of at least a portion of said at least a forth colorable area and generally simultaneously said at least a third barcode becomes readable as a result of coloring of at least a portion of said at least a third colorable area.

12. A method according to claim 11, wherein:

said at least a third colorable area is initially uncolored and forms part of a third set of initially uncolored, colorable areas positioned at locations of bars of said at least a third barcode which appear only when said at least a third barcode is in a third barcode readable state following exceedance of said at least one additional threshold, said third barcode is in a third barcode unreadable state prior to exceedance of said at least one additional threshold, as a result of said third set being uncolored, more than a single narrow barcode bar is missing from said at least a third barcode, and said at least a fourth colorable area is initially uncolored and forms part of a fourth set of initially uncolored, colorable areas positioned at locations between bars of said at least a second barcode when said second barcode is in a second barcode readable state prior to exceedance of said at least one additional threshold.

* * * * *